(12) United States Patent
Lee et al.

(10) Patent No.: US 11,860,667 B2
(45) Date of Patent: Jan. 2, 2024

(54) DISPLAY DEVICE COMPRISING PRESSURE SENSOR

(71) Applicant: Samsung Display Co., Ltd., Yongin-si (KR)

(72) Inventors: Choon Hyop Lee, Anyang-si (KR); Sang Chul Lee, Yongin-si (KR); Ga Young Kim, Hwaseong-si (KR); Kang Won Lee, Seoul (KR); Seung Hwan Chung, Seongnam-si (KR); Do Ik Kim, Suwon-si (KR)

(73) Assignee: Samsung Display Co., Ltd., Yongin-si (KR)

(*) Notice: Subject to any disclaimer, the term of this patent is extended or adjusted under 35 U.S.C. 154(b) by 81 days.

(21) Appl. No.: 17/263,705

(22) PCT Filed: Dec. 20, 2018

(86) PCT No.: PCT/KR2018/016282
§ 371 (c)(1),
(2) Date: Jan. 27, 2021

(87) PCT Pub. No.: WO2020/022589
PCT Pub. Date: Jan. 30, 2020

(65) Prior Publication Data
US 2021/0294475 A1    Sep. 23, 2021

(30) Foreign Application Priority Data
Jul. 27, 2018 (KR) .................... 10-2018-0088079

(51) Int. Cl.
*G06F 3/041* (2006.01)

(52) U.S. Cl.
CPC ............................ *G06F 3/04146* (2019.05)

(58) Field of Classification Search
CPC ......... G06F 2203/04105; G06F 3/0412; G06F 3/04886; G06F 3/04146; G06F 2203/04102; G06F 1/1652; H04M 1/0268
See application file for complete search history.

(56) References Cited

U.S. PATENT DOCUMENTS

| 11,216,177 | B2* | 1/2022 | Seomoon | G06F 3/0482 |
| 2011/0273396 | A1* | 11/2011 | Chung | G06F 3/044 |
| | | | | 345/174 |

(Continued)

FOREIGN PATENT DOCUMENTS

| CN | 104851363 A | 8/2015 |
| CN | 107623080 A | 1/2018 |

(Continued)

OTHER PUBLICATIONS

International Search Report for corresponding Application No. PCT/KR2018/016282 dated Apr. 22, 2019, 4pp.

(Continued)

*Primary Examiner* — Priyank J Shah
(74) *Attorney, Agent, or Firm* — Lewis Roca Rothgerber Christie LLP

(57) ABSTRACT

A display device comprises: a display panel; a window; and a first pressure sensor. The display panel comprises: a planar portion; a first curved portion connected to one side of the planar portion; and a first side portion connected to one side of the first curved portion. The window is on the display panel. The first pressure sensor overlaps with the first side portion. Here, the first side portion is in a plane different from each of the planar portion and the first curved portion.

22 Claims, 26 Drawing Sheets

(56) References Cited

U.S. PATENT DOCUMENTS

| | | | |
|---|---|---|---|
| 2012/0162211 A1 | 6/2012 | Choi et al. | |
| 2013/0076649 A1* | 3/2013 | Myers | G06F 3/04817 |
| | | | 361/679.01 |
| 2015/0029683 A1* | 1/2015 | Kim | H01L 51/0097 |
| | | | 361/749 |
| 2015/0077350 A1* | 3/2015 | Hinson | G06F 3/0445 |
| | | | 345/173 |
| 2015/0109243 A1* | 4/2015 | Jun | G06F 3/04886 |
| | | | 345/174 |
| 2015/0331444 A1* | 11/2015 | Rappoport | G06F 1/1601 |
| | | | 362/249.02 |
| 2015/0331451 A1* | 11/2015 | Shin | H04M 1/0202 |
| | | | 345/173 |
| 2016/0066440 A1 | 3/2016 | Choi et al. | |
| 2016/0195976 A1* | 7/2016 | Yang | G06F 3/0416 |
| | | | 345/173 |
| 2016/0234362 A1* | 8/2016 | Moon | H04M 1/0202 |
| 2016/0293895 A1* | 10/2016 | Kim | H01L 51/5281 |
| 2016/0299527 A1* | 10/2016 | Kwak | G06F 1/1637 |
| 2017/0206835 A1 | 7/2017 | Hirakata et al. | |
| 2017/0357440 A1* | 12/2017 | Tse | G06F 3/0482 |
| 2018/0143669 A1 | 5/2018 | Bok et al. | |
| 2019/0087046 A1* | 3/2019 | Guo | G06F 3/04166 |
| 2019/0163003 A1 | 5/2019 | Kim et al. | |
| 2019/0272074 A1* | 9/2019 | Brunton | G06F 3/045 |
| 2019/0289108 A1* | 9/2019 | Jo | H04M 1/236 |
| 2020/0245476 A1* | 7/2020 | Wang | H05K 5/0017 |
| 2020/0301534 A1* | 9/2020 | Kim | G06F 3/041 |
| 2020/0371659 A1* | 11/2020 | Kim | G06F 3/044 |

FOREIGN PATENT DOCUMENTS

| | | |
|---|---|---|
| CN | 108089744 A | 5/2018 |
| EP | 3333667 A1 | 6/2018 |
| KR | 10-2012-0072297 A | 7/2012 |
| KR | 10-2014-0049792 A | 4/2014 |
| KR | 10-2016-0149982 A | 12/2016 |
| KR | 10-2016-0150070 A | 12/2016 |
| KR | 10-2017-0086538 A | 7/2017 |
| KR | 10-2018-0057796 A | 5/2018 |
| KR | 10-1865303 B1 | 5/2018 |
| KR | 10-2020-0013203 A | 2/2020 |
| WO | WO 2018/021694 A1 | 2/2018 |

OTHER PUBLICATIONS

Chinese Office Action dated Sep. 21, 2023, issued in corresponding Chinese Patent Application No. 201880096101.X, 8 pages.

* cited by examiner

DISPLAY DEVICE COMPRISING PRESSURE SENSOR

CROSS-REFERENCE TO RELATED APPLICATIONS

This application is a U.S. National Phase Patent Application of International Application Number PCT/KR2018/016282, filed on Dec. 20, 2018, which claims priority to and the benefit of Korean Patent Application Number 10-2018-0088079, filed on Jul. 27, 2018, the entire content of each of which is incorporated herein by reference.

BACKGROUND

Technical Field

The present invention relates to a display device, and more particularly, to a display device including a pressure sensor.

Related Art

Electronic devices, such as smart phones, tablet personal computers (PCs), digital cameras, notebook computers, navigation systems, and smart televisions which provide images to users, include display devices for displaying images. The display devices include display panels for generating and displaying images and various input devices.

Recently, focusing on smart phones or tablet PCs, touch panels which recognize a touch input have been widely applied to the display devices. With the convenience of a touch method, there is a trend of replacing the existing physical input devices, such as keypads and the like, with the touch panels.

The above information disclosed in this Background section is only for enhancement of understanding of the background and therefore the information discussed in this Background section does not necessarily constitute prior art.

DISCLOSURE

Technical Problem

In addition to touch panels, research is being conducted to mount pressure sensors on display devices and use the pressure sensors as substitutes for the existing physical buttons.

The present invention is directed to providing a display device including a pressure sensor allowing an easy input.

It should be noted that objects of the present invention are not limited to the above-described objects, and other technical objects of the present invention will be apparent to those skilled in the art from the following description.

Technical Solution

One aspect of the present invention provides a display device including a display panel including a planar portion, a first curved portion connected to one side of the planar portion, and a first side surface connected to one side of the first curved portion; a window on the display panel; and a first pressure sensor overlapping the first side surface. Here, the first side surface may be located non-coplanar with each of the flat surface and the first curved surface.

The first side surface may be formed to protrude from the one side of the first curved surface in a first direction, and a protruding length of the first side surface may be greater than or equal to 4 mm.

A length of the first side surface in a second direction may be smaller than a length of the planar portion in the second direction, and the second direction may be perpendicular to the first direction.

The window may include a first cover portion overlapping the first side surface of the display panel, and the first cover portion may be larger than the first side surface.

The display device may further include a bracket below the display panel, and the window may be coupled to the bracket through waterproof tape between a side surface of the first cover portion and an upper surface of the bracket.

The display device may further include a cover panel which is below the display panel and overlaps the planar portion and the first curved portion, the first pressure sensor may be below the display panel, and the first pressure sensor may not overlap the cover panel.

The display device may further include a touch member between the display panel and the window, and the touch member may include a first sensing portion overlapping the first side surface.

The display device may further include a touch member between the planar portion of the display panel and the window, and an insulating member between the first side surface of the display panel and the first cover portion of the window, and the touch member may not overlap the insulating member.

The window may further include a light blocking member on a lower surface of the first cover portion, and the first pressure sensor may be coupled to the first cover portion of the window.

The display device may further include a bracket below the display panel, and the window may be coupled to the bracket through waterproof tape between a lower surface of the first cover portion and a side surface of the bracket.

The bracket may include a tactile pattern formed on an outer surface adjacent to the first cover portion of the window.

The display device may further include a second pressure sensor, the display panel may further include a second curved portion connected to the other side different from the one side of the planar portion and a second side surface connected to one side of the second curved portion, the second side surface may be located non-coplanar with each of the planar portion and the second curved portion of the display panel, and the second pressure sensor may overlap the second side surface.

When a pressure is simultaneously applied to the first pressure sensor and the second pressure sensor, a squeezing operation may be performed.

The display device may further include a second pressure sensor overlapping a second side surface of the display panel, the second side surface may be connected to the one side of the first curved portion of the display panel and separated from the first side surface, and the second pressure sensor may have an area different from an area of the first pressure sensor.

The display device may further include a third force sensor, the display panel may further include a third curved portion connected to the other side different from the one side of the planar portion and a third side surface connected to one side of the second curved portion, the third side surface may be located non-coplanar with each of the planar portion and the second curved portion of the display panel, and the third pressure sensor may overlap the third side surface.

The display device may further include a fourth pressure sensor overlapping a fourth side surface of the display panel, and the fourth side surface may be connected to the one side of the second curved portion of the display panel and separated from the third side surface.

The display panel may further include an alignment mark formed on the first side surface.

The display panel may include a first pixel on the planar portion and configured to display an image, and a second pixel on the first side surface and configured to display an image, and the second pixel has an area that is smaller than an area of the first pixel.

The first pressure sensor may include a first substrate and a second substrate; a first driving electrode, a second driving electrode, a first sensing electrode, and a second sensing electrode which are on one surface of the first substrate facing the second substrate; a first pressure sensing layer on one surface of the second substrate facing the first substrate; and a second pressure sensing layer in contact with the second driving electrode and the second sensing electrode, the first pressure sensing layer may overlap the first driving electrode and the first sensing electrode, and a gap may be present between the first pressure sensing layer and the first driving electrode and the first sensing electrode.

A plurality of first driving electrodes and a plurality of first sensing electrodes may be on one surface of the first substrate, the first driving electrodes and the first sensing electrodes may be formed to extend in a first direction, and the first driving electrodes and the first sensing electrodes may be alternately arranged in a second direction crossing the first direction.

The first pressure sensor may further include a driving connection electrode to which the first driving electrodes and the second driving electrode are connected, a sensing connection electrode to which the first sensing electrodes and the second sensing electrode are connected, a drive line which is connected to the driving connection electrode and to which a driving voltage is applied, and a sensing line connected to the sensing connection electrode.

The number of the first driving electrodes may be greater than the number of the second driving electrodes, and the number of the first sensing electrodes may be greater than the number of the second sensing electrodes.

Another aspect of the present invention provides a display device including a display panel including a planar portion and a first side surface connected to one side of the planar portion and perpendicular to the planar portion; a window on the display panel; and a first pressure sensor overlapping the first side surface. Here, the first side surface may be formed to protrude from the one side of the planar portion in a first direction.

The details of other embodiments are included in the detailed description and the accompanying drawings.

Advantageous Effects

In accordance with a display device according to one embodiment, a display panel includes a planar portion and a side surface perpendicular thereto and includes a pressure sensor overlapping the side surface so that a physical button can be internalized.

The effects according to the embodiments of the present invention are not limited by the contents described above, and more various effects are included in the present specification.

MODES OF THE INVENTION

Figure 1:
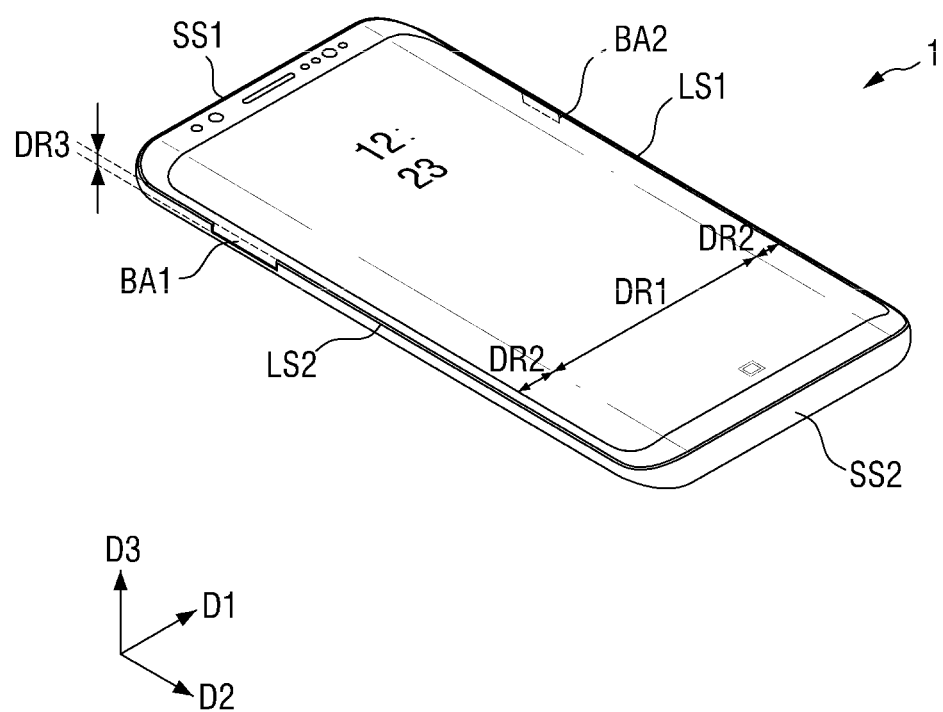
FIG. 1 is a perspective view illustrating a display device according to one embodiment of the present invention.

Characteristics and features of the present invention and methods for achieving them will be made clear from embodiments described in detail below with reference to the accompanying drawings. The present invention may, however, be implemented in many different forms and should not be construed as being limited to the embodiments set forth herein, and the embodiments are provided such that this disclosure will be thorough and complete and will fully convey the scope of the present invention to those skilled in the art to which the present invention pertains, and the present invention is defined by only the scope of the appended claims.

When an element or layer is "on" another element or layer, the element is directly on another element or layer or on another element another layer with still another element therebetween. The same reference numerals refer to the same components throughout this disclosure.

Although the terms first, second, and the like are used to describe various components, these components are not substantially limited by these terms. These terms are used only to distinguish one component from another component. Therefore, a first component described below may be substantially a second component within the technical spirit of the present invention.

Hereinafter, aspects of some example embodiments of the present invention will be described with reference to the accompanying drawings.

FIG. 1 is a perspective view illustrating a display device according to one embodiment of the present invention.

Referring to FIG. 1, a display device 1 displays an image. The display device 1 may be formed in a substantially rectangular shape when viewed in a plan view. The display device 1 may have a rectangular shape with a vertical corner or a round corner when viewed in the plan view. The display device 1 may include two long sides LS1 and LS2 and two short sides SS1 and SS2. In the rectangular-shaped display device 1 and a member such as a display panel 30 included therein, when viewed in the plan view, a long side located on a right side will be referred to as a first long side LS1, a long side located on a left side will be referred to as a second long side LS2, a short side located on an upper side will be referred to as a first short side SS1, and a short side located at a lower side will be referred to as a second short side SS2. The lengths of the long sides LS1 and LS2 of the display device 1 may range from 1.5 to 2.5 times the lengths of the short sides SS1 and SS2, but the present invention is not limited thereto.

The display device 1 may include a first area DR1, a second area DR2, and a third area DR3 which are arranged non-coplanar with each other. The first area DR1 is arranged on a first surface. The second area DR2 is connected to the first area DR1 and bent or curved therefrom. The second area DR2 may be arranged on a second surface having a predetermined intersection angle (e.g., an acute angle) with respect to the first surface or may have a curved portion. The second area DR2 is arranged in the vicinity of the first area DR1. The third area DR3 is connected to the second area DR2 and bent or curved therefrom. The third area DR3 may be arranged on a third surface having a predetermined intersection angle (e.g., a right angle) with respect to the first surface.

The first area DR1 is used as a main display surface. The second area DR2 may also be used as a display area of the display device 1. The third area DR3 may also be used as a display area, but the present invention is not limited thereto. Hereinafter, an example case in which the first area DR1 of the display device 1 is a planar portion, the second area DR2 is a curved portion, and the third area DR3 is a planar portion (or a side surface) will be described, but the present invention is not limited thereto. The second area DR2 may have a constant curvature or a shape whose curvature is varied.

The second area DR2 may be arranged on an edge of the display device 1 or an edge of a front surface thereof. Here, the front surface may be a surface shown on the plan view of the display device 1 or may be a surface which is visually recognized when the display device 1 is viewed from the top. The second area DR2 may be arranged at edges of the two opposite long sides LS1 and LS2 of the display device 1. However, the present invention is not limited thereto, and the second area DR2 may be arranged at an edge of one side of the display device 1, arranged on the two short sides SS1 and SS2 thereof, arranged at edges of three sides thereof, or arranged at edges of all sides thereof. In some embodiments, the second area DR2 may be omitted.

The third area DR3 may be arranged on the side surface of the display device 1. Because the third area DR3 is connected to the second area DR2, the third area DR3 may be arranged on two opposite side surfaces of the display device 1 (e.g., side surfaces in contact with the two long sides LS1 and LS2).

As shown in FIG. 1, the third area DR3 may include a first button area BA1 (or a first active area and a first sensing area) and a second button area BA2 (or a second active area and a second sensing area). The first button area BA1 may be located in a portion of a second side surface in contact with the second long side LS2, and the second button area BA2 may be located in a portion of a first side surface in contact with the first long side LS1. The second button area BA2 may be substantially the same as the first button area BA1, except for a length and an arrangement position in a second direction D2. Hereinafter, a common configuration (or a feature and an internal configuration) of the first button area BA1 and the second button area BA2 will be described based on the first button area BA1.

The first area DR1, the second area DR2, and the third area DR3 may independently display images. The first area DR1, the second area DR2, and the third area DR3 may display different images, or only the third area DR3 may display an image. The display device 1 may display an image (e.g., a digital watch image, a button image, or the like) through at least one of the first button area BA1 or the second button area BA2 which are included in the third area DR3.

The display device 1 may detect an external input (e.g., force touch) through at least one of the first button area BA1 or the second button area BA2.

Meanwhile, in FIG. 1, the two button areas BA1 and BA2 located in the portion of the side surface of the display device 1 have been illustrated, but the present invention is not limited thereto. For example, the display device 1 may include one button area or three or more button areas. In addition, the first button area BA1 may be arranged on an entirety of the second side surface.

Figure 2:
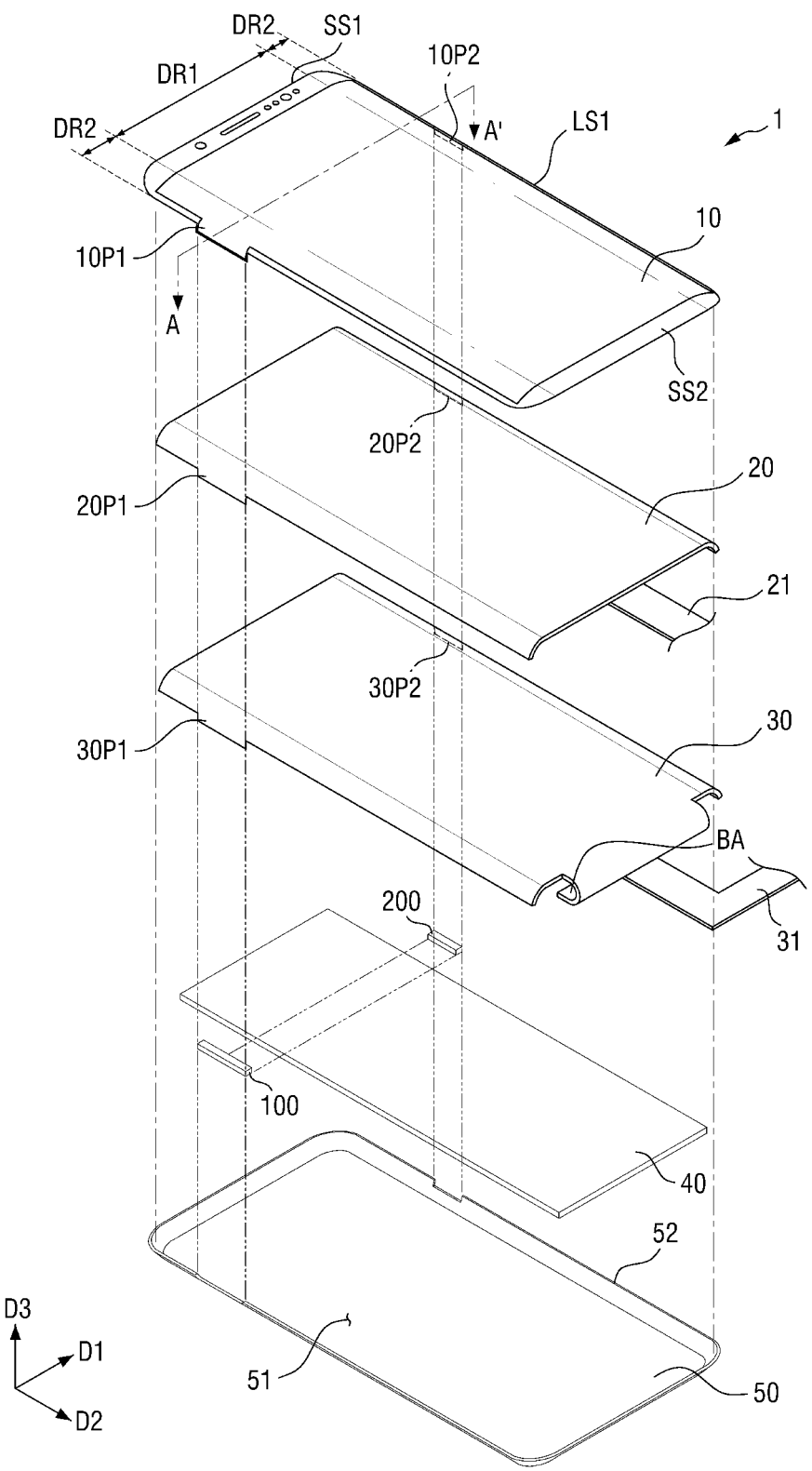
FIG. 2 is an exploded perspective view illustrating an example of the display device of FIG. 1.
Figure 3:
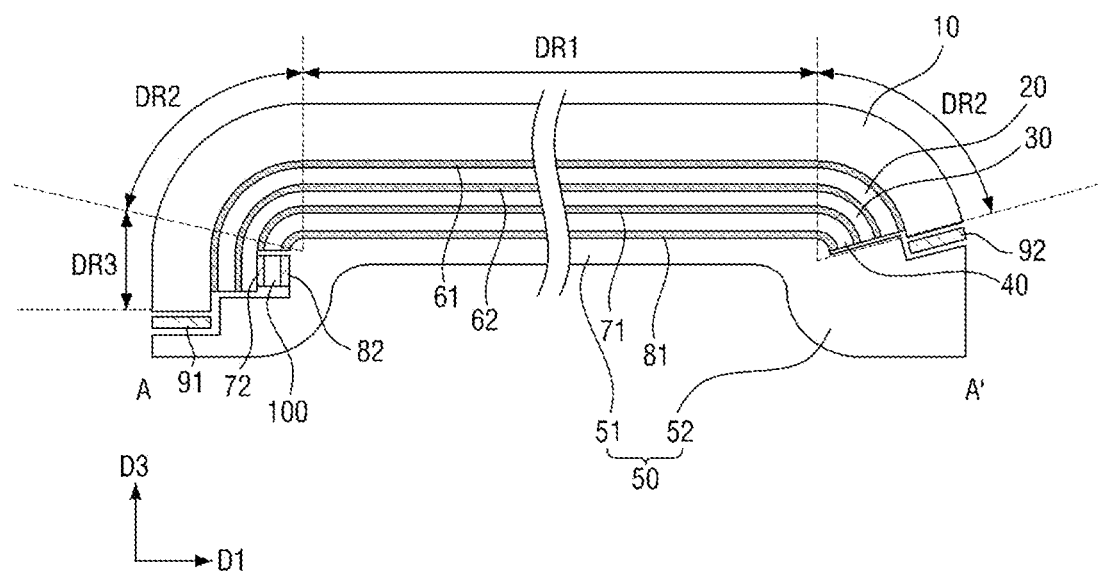
FIG. 3 is a cross-sectional view illustrating an example of the display device taken along the line A-A' of FIG. 2.

FIG. 2 is an exploded perspective view illustrating an example of the display device of FIG. 1. FIG. 3 is a cross-sectional view illustrating an example of the display device taken along the line A-A' of FIG. 2.

Referring to FIGS. 1 to 3, the display device 1 includes the display panel 30 and pressure sensors 100 and 200 which are arranged in the vicinity of an edge of the display panel 30. The display device 1 may further includes a window 10 arranged above the display panel 30, a cover panel 40 (or a cover panel sheet) arranged below the display panel 30, and a bracket 50 (or a middle mold frame) arranged below the cover panel 40.

Unless otherwise defined, in this disclosure, the terms "upper portion" and "upper surface" in a thickness direction mean a display surface side based on the display panel 30, and the terms "lower portion" and "lower surface" mean a side opposite to the display surface based on the display panel 30. In addition, the terms "on (upper)," "under (below)," "left," and "right" in a plane direction indicate a direction when viewed from the top with the display surface in a correct position.

The display panel 30 displays a screen and, for example, an organic light-emitting display panel may be applied as the display panel 30. In the following embodiments, an organic light-emitting display panel is applied as the display panel 30, but the present invention is not limited thereto, and other types of display panels such as a liquid crystal display device, an electrophoretic device, and the like may be applied as the display panel 30. A first flexible circuit board 31 may be coupled to the display panel 30.

The display panel 30 includes a plurality of organic light-emitting devices arranged on a substrate. The substrate may be a rigid substrate made of glass, quartz, or the like, or a flexible substrate made of polyimide or another polymer resin. When a polyimide substrate is applied as the substrate, the display panel 30 may be bent, turned, folded, or rolled. In FIG. 2, a case in which the display panel 30 is bent toward the second short side SS2 is illustrated. In this case, the first flexible circuit board 31 may be attached to a bending area BA of the display panel 30.

In embodiments, the display panel 30 may include a main display portion corresponding to the first and second areas DR1 and DR2 of the display device 1 (or a planar portion corresponding to the first area DR1 and a curved portion corresponding to the second area DR2), a first sub-display portion 30P1 (or the first side surface) corresponding to the first button area BA1 of display device 1, and a second sub-display portion 30P2 (or the second side surface) corresponding to the second button area BA2. The second sub-display portion 30P2 may be arranged opposite to the first sub-display portion 30P1. A length of the second sub-display portion 30P2 (i.e., a length in the second direction D2) may be the same as a length of the first sub-display portion 30P1 or may be different therefrom as shown in FIG. 2.

The window 10 is located above the display panel 30. The window 10 is located above the display panel 30 to protect the display panel 30 and allows light emitted from the display panel 30 to pass through the window 10. The window 10 may be made of glass, transparent plastic, or the like.

The window 10 may be arranged to overlap the display panel 30 and cover an entirety of a front surface of the display panel 30. The window 10 may be larger than the display panel 30. For example, the window 10 may protrude further outward from the two short sides SS1 and SS2 of the display device 1 than the display panel 30. The window 10 may protrude from the display panel 30 even on the two long sides LS1 and LS2 of the display device 1, but a protruding length may be greater in the case of the two short sides SS1 and SS2.

In embodiments, the window 10 may include a main cover portion corresponding to the first and second areas DR1 and DR2 of the display device 1, a first cover portion 10P1 (or a first sub-cover portion) corresponding to the first button area BA1 of the display device 1, and a second cover portion 10P2 (or a second sub-cover portion) corresponding to the second button area. The first cover portion 10P1 protrudes more than the first sub-display portion 30P1 of the display panel 30 to cover the first sub-display portion 30P1. For example, the first cover portion 10P1 protrudes further in the second direction D2 and a third direction D3 than the first sub-display portion 30P1 of the display panel 30. Similarly, the second cover portion 10P2 may protrude more than the second sub-display portion 30P2 of the display panel 30 to cover the second sub-display portion 30P2.

In embodiments, the display device 1 may further include a touch member 20 (or an input sensing panel) located between the display panel 30 and the window 10. The touch member 20 may be a rigid panel type, a flexible panel type, or a film type. The touch member 20 has a size that is substantially the same size as a size of the display panel 30 and is arranged to overlap the display panel 30, and the side surfaces of the sides of the bent display panel 30, except for one short side SS2, may be arranged with a side surface of the touch member 20, but the present invention is not limited thereto. The display panel 30 and the touch member 20, and the touch member 20 and the window 10 may be bonded by transparent bonding layers 61 and 62 such as an optically transparent adhesive (OCA) or an optically transparent resin (OCR). A second flexible circuit board 21 may be coupled to the touch member 20.

The touch member 20 may be omitted. In this case, the display panel 30 and the window 10 may be bonded by an OCA or an OCR. In some embodiments, the display panel 30 may include a touch electrode portion therein.

In embodiments, the touch member 20 may include a main sensing portion corresponding to the first and second areas DR1 and DR2 of the display device 1, a first sub-sensing portion 20P1 corresponding to the first button area BA1 of the display device 1, and a second sub-sensing portion 20P2 corresponding to the second button area BA2. The first sub-sensing portion 20P1 may completely overlap the first sub-display portion 30P1 of the display panel 30, and the second sub-sensing portion 20P2 may completely overlap the second sub-display portion 30P2 of the display panel 30.

The cover panel 40 and the pressure sensors 100 and 200 (or force sensors) are arranged below the display panel 30. The cover panel 40 and the pressure sensors 100 and 200 may be attached to a lower surface of the display panel 30 through bonding layers 71, 72, and 73 such as a pressure-sensitive adhesive layer or an adhesive layer.

The cover panel 40 is arranged to overlap a central portion of the display panel 30. That is, the cover panel 40 may overlap the display panel 30 in the first area DR1 and the second area DR2 of the display device 1 and may not overlap the display panel 30 in the third area DR3 of the display device 1. The cover panel 40 may generally have a size similar to a size of the display panel 30 and may expose a lower surface of the display panel 30 in the first button area BA1 and the second button area BA2 in which the pressure sensors 100 and 200 are located. However, the present invention is not limited thereto, and the cover panel 40 may have the same shape and size as the display panel 30 and cover the first and second sub-display portions 30P1 and 30P2 of the display panel 30.

The cover panel 40 may perform a function of dissipating heat, a function of blocking electromagnetic waves, a function of preventing pattern visibility, a grounding function, a buffer function, a function of reinforcing strength, and/or a digitizing function. The cover panel 40 may include a functional layer having at least one among the above-described functions. The functional layer may be provided in various forms such as a layer, a membrane, a film, a sheet, a plate, and a panel. The cover panel 40 may include one functional layer or a plurality of functional layers. For example, the cover panel 40 may include a buffer sheet, a graphite sheet, and a copper sheet which are sequentially stacked from top to bottom.

The pressure sensors 100 and 200 may be arranged to overlap the first sub-display portion 30P1 and the second sub-display portion 30P2 of the display panel 30. As described below, a height of each of the pressure sensors 100 and 200 in the third direction D3 may range from 2 mm to 6 mm or may be greater than or equal to 4 mm. When the height of each of the pressure sensors 100 and 200 is greater than or equal to 4 mm, a touch input by a user's finger may be more accurately detected.

The pressure sensors 100 and 200 may be provided as a plurality of pressure sensors. As illustrated in the drawings, the pressure sensor may include a first pressure sensor 100 arranged to overlap the first sub-display portion 30P1 of the display panel 30 and a second pressure sensor 200 arranged to overlap the second sub-display portion 30P2 of the display panel 30.

The first and second pressure sensors 100 and 200 may be attached to a lower surface of the first sub-display portion 30P1 and a lower surface of the second sub-display portion 30P2 of the display panel 30, which are exposed by the cover panel 40, respectively. The pressure sensors 100 and 200 may be arranged in the third area DR3 of the display device 1 and may not be arranged in the first area DR1 and the second area DR2. However, the present invention is not limited thereto, and the pressure sensors 100 and 200 may be arranged to extend in the first direction D1 to a portion of the second area DR2 or extend to a portion of the first area DR1.

The pressure sensors 100 and 200 may not overlap the cover panel 40 in the thickness direction, but the present invention is not limited thereto. For example, the cover panel 40 may include a first protrusion corresponding to the first button area BA1 and a second protrusion corresponding to the second button area BA2, and the pressure sensors 100 and 200 may also be arranged to overlap the first protrusion and the second protrusion of the cover panel 40.

The bracket 50 is arranged below the pressure sensors 100 and 200 and the cover panel 40. The bracket 50 may be an accommodation container or a protective container for storing other parts. For example, the bracket 50 may accommodate the touch member 20, the display panel 30, the pressure sensors 100 and 200, and the cover panel 40. As shown in FIG. 2, the bracket 50 may include grooves corresponding to the first sub-display portion 30P1 (and the second sub-display portion 30P2) of the display panel 30 and the first pressure sensor 100 (and the second pressure sensor 200).

Referring to FIG. 3, the bracket 50 may include a bottom portion 51 and a side wall 52 which is bent from a side of the bottom portion 51.

The bottom portion 51 of the bracket 50 faces the cover panel 40. In addition, the bottom portion 51 of the bracket 50 faces the pressure sensors 100 and 200. The pressure sensors 100 and 200 and the cover panel 40 may be bonded to the bottom portion 51 of the bracket 50 through bonding layers 81 and 82 such as a pressure-sensitive adhesive layer or an adhesive layer. In one embodiment, the bonding layer 82 for bonding the pressure sensors 100 and 200 to the bracket 50 may be waterproof tape, but the present invention is not limited thereto.

The side wall 52 of the bracket 50 faces side surfaces of the touch member 20, the display panel 30, the pressure sensors 100 and 200, and the cover panel 40. An upper end of the side wall 52 of the bracket 50 faces the window 10. An outer surface of the bracket 50 may be arranged with an outer surface of the window 10. The window 10 may be bonded to the bracket 50 through waterproof tapes 91 and 92. For example, the waterproof tapes 91 and 92 are interposed between the side surface of the window 10 and the upper end of the side wall 52 of the bracket 50 (e.g., an upper surface in the third direction D3), and thus the window 10 may be bonded to the bracket 50.

Figure 4:
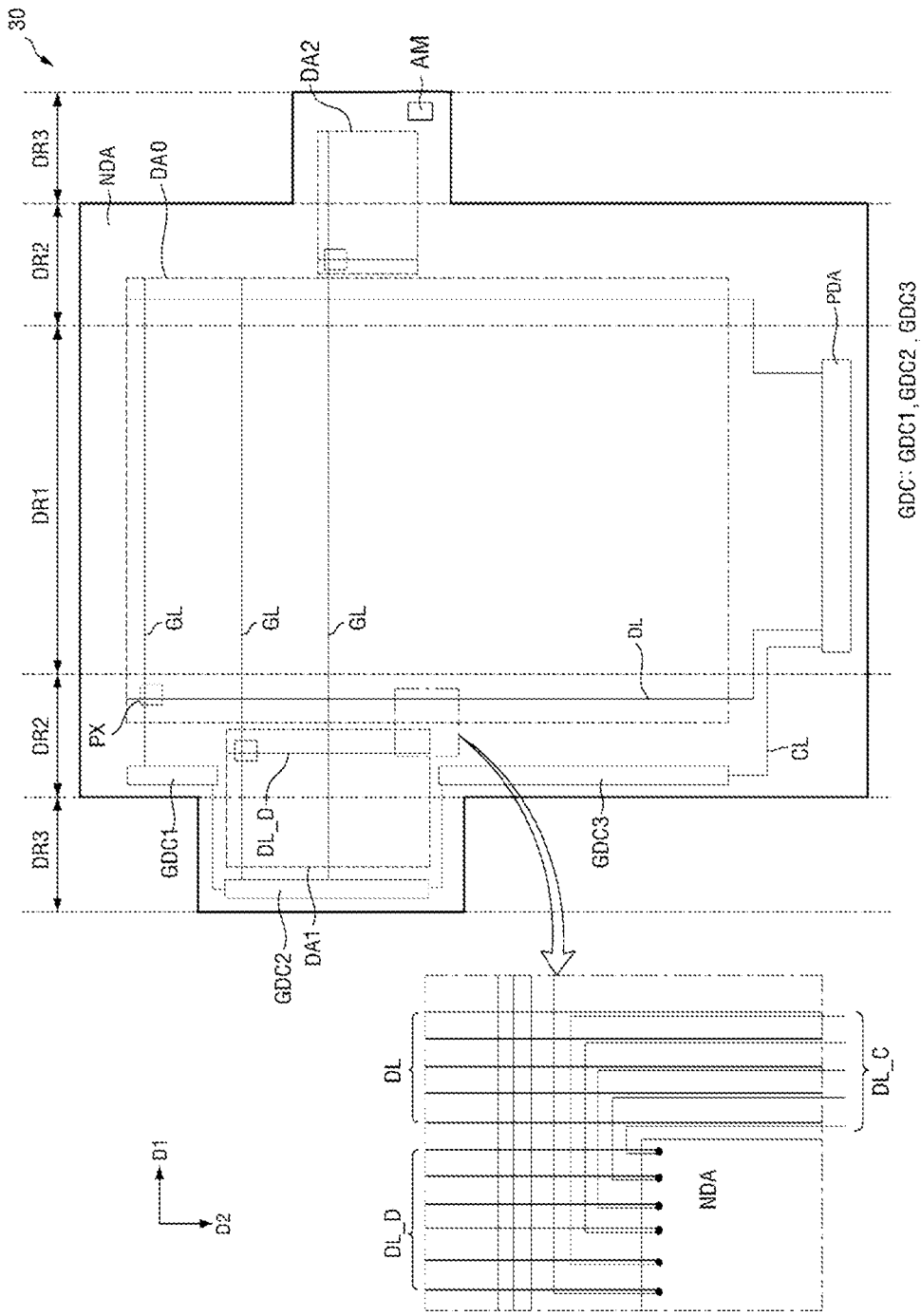
FIG. 4 is a plan view illustrating an example of a display panel included in the display device of FIG. 1.
Figure 5:
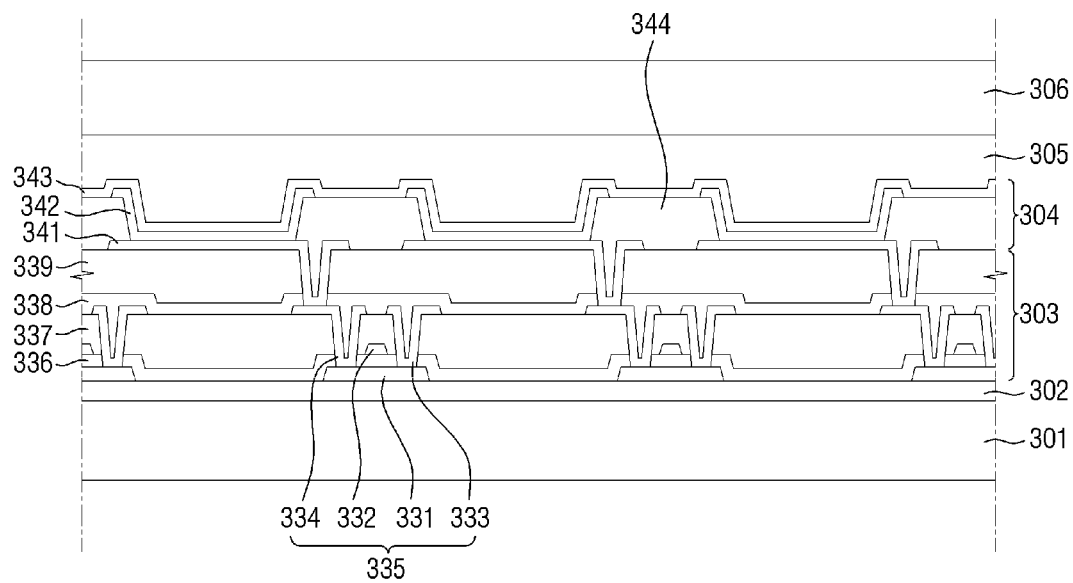
FIG. 5 is a cross-sectional view illustrating an example of the display panel of FIG. 4.
Figure 6:
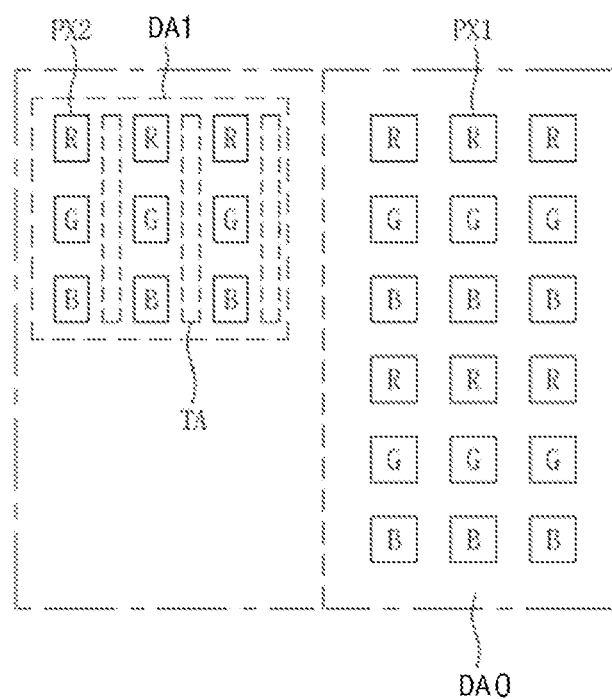
FIG. 6 is a plan view illustrating an example of the display panel.

FIG. 4 is a plan view illustrating an example of the display panel included in the display device of FIG. 1. For convenience of description, FIG. 4 shows the display panel 30 in an unfolded state (or a deployed state). FIG. 5 is a cross-sectional view illustrating an example of the display panel of FIG. 4. FIG. 5 shows a cross section of a display area of the display panel. FIG. 6 is a plan view illustrating an example of the display panel. FIG. 6 shows an area corresponding to a partially enlarged view shown in FIG. 4.

Referring to FIG. 4, the display panel 30 includes a drive circuit GDC, a plurality of signal lines CL, DL, GL, DL_D, and DL_C, a pad portion PDA, and a pixel PX.

The pixel PX is the minimum display unit which displays an image and may include a light-emitting area from which light is emitted (for example, an area in which a light-emitting device is located) and a non-light-emitting area from which light is not emitted (for example, an area in which a circuit element for supplying a current to the light-emitting device is located).

A display area DA may include a main display area DA0, a first sub-display area DA1, and a second sub-display area DA2. The main display area DA0 may be located in the first area DR1 and the second area DR2. The first sub-display area DA1 may be located to overlap the first button area BA1 (or the third area DR3) and the second area DR2 of the display device 1 and connected to the main display area DA0. The first sub-display area DA1 may not coincide with the first button area BA1, but the present invention is not limited thereto. For example, the first sub-display area DA1 may be located in only the first button area BA1 and may not be connected to the main display area DA0. Similarly, the second sub-display area DA2 may be located to overlap the second button area BA2 and the second area DR2 of display device 1 and connected to the main display area DA0. The second sub-display area DA2 may also not coincide with the second button area BA2, but the present invention is not limited thereto.

The non-display area NDA is an area in which the pixel PX is not arranged and may be arranged along an edge of the display area DA on a developed view of the display device 1. A control line CL, a signal line DL, and a drive circuit GDC may be arranged in the non-display area NDA. The non-display area NDA may include a black matrix which blocks leakage light, a decoration ink, and the like, but the present invention is not limited thereto.

The drive circuit GDC generates a plurality of scan signals and sequentially outputs the scan signals to a plurality of scan lines GL which will be described below. In addition, a scan drive circuit GDC may generate a plurality of light emission control signals and output the plurality of light emission control signals to a plurality of light emission control lines (not shown). The drive circuit GDC may also include a plurality of drive circuits GDC1, GDC2, and GDC3. A second drive circuit GDC2 may be arranged in the first sub-display portion 30P1 (see FIG. 2) to correspond to the first sub-display area DA1 (or the second sub-display area DA2), and the first drive circuit GDC1 and the third drive circuit GDC3 may be arranged on an upper side and a lower side based on the second drive circuit GDC2.

Although not shown in FIG. 4, the display panel 30 may be electrically connected to a data drive circuit in the form of being mounted on the first flexible circuit board 31 which is described with reference to FIG. 2 through the pad portion PDA, or a data drive circuit may be integrated in the pad portion PDA.

The signal lines CL, DL, GL, DL_D, and DL_C may include control lines GL, data lines DL, dummy data lines DL_D, and connection lines DL_C. Although not shown in FIG. 4, the signal lines CL, DL, GL, DL_D, and DL_C may further include a power line to which a power voltage is applied and an initialization voltage line to which an initialization voltage is applied.

The pad portion PDA may be connected to ends of the control lines GL, the data lines DL, and the connection lines DL_C.

Each of the scan lines GL is connected to a corresponding pixel PX among the pixels PX. The data lines DL and the dummy data lines DL_D are each connected to a corresponding pixel PX among the pixels PX. The data lines DL may be arranged in the main display area DA0, and the dummy data lines DL_D may be arranged in the first sub-display area DA1 and the second sub-display area DA2.

The dummy data lines DL_D are arranged to extend to the first sub-display area DA1 and the second sub-display area DA2 via the non-display area NDA. Alternatively, as shown in the partially enlarged view of FIG. 4, the dummy data lines DL_D may be electrically connected to the pad portion PDA through the connection lines DL_C arranged passing through the display area DA. The connection lines DL_C may be arranged on a layer different from layers of the data lines DL and the dummy data lines DL_D and insulated from the data lines DL and the dummy data lines DL_D. The dummy data lines DL_D are connected to the pad portion PDA through the connection lines DL_C passing through the display area DA so that an area of the non-display area NDA (or a dead space) of the display panel 30 may be reduced.

In embodiments, the display panel 30 may include an alignment mark AM formed in the second sub-display portion 30P2 (see FIG. 2). As shown in FIG. 4, the alignment mark AM may be arranged in a non-display area NDA (i.e., a non-display area adjacent to the second sub-display area DA2) corresponding to the second sub-display portion 30P2 (see FIG. 2). Here, during a process of bonding the display panel 30 to the window 10 (or the touch member 20), the alignment mark AM may be used as an identification mark for identifying a position of the display panel 30 or for aligning the display panel 30. In addition, the alignment mark AM may be used to define a bezel in the display device 1. The alignment mark AM may be provided in various shapes. The alignment mark AM is formed in the second sub-display portion 30P2 (see FIG. 2) so that a width of the non-display area NDA adjacent to the main display area DA0 may be reduced.

Meanwhile, FIG. 4 shows only one alignment mark AM which is located in the second sub-display portion 30P2 (see FIG. 2), but the present invention is not limited thereto. For example, two or more alignment marks AM may be arranged even in the first sub-display portion 30P1 (see FIG. 2) (i.e., the non-display area NDA adjacent to the first sub-display area DA1).

Referring to FIG. 5, the display panel 30 may include a support substrate 301, a flexible substrate 302, a thin film transistor layer 303, a light-emitting device layer 304, an encapsulation layer 305, and a barrier film 306.

The flexible substrate 302 is arranged on the support substrate 301. Each of the support substrate 301 and the flexible substrate 302 may contain a polymer material having flexibility. For example, each of the support substrate 301 and the flexible substrate 302 may be formed of polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof.

The thin film transistor layer 303 is formed on the flexible substrate 302. The thin film transistor layer 303 includes thin film transistors 335, a gate insulating layer 336, an interlayer insulating layer 337, a protective layer 338, and a planarization layer 339.

A buffer layer may be formed on the flexible substrate 302. The buffer layer may be formed on the flexible substrate 302 so as to protect the thin film transistors 335 and light-emitting devices from moisture penetrating through the support substrate 301 and the flexible substrate 302 which are vulnerable to moisture permeation. The buffer layer may be formed of a plurality of inorganic layers which are alternately stacked. For example, the buffer layer may be formed as a multilayer in which one or more inorganic layers among a silicon oxide ($SiO_x$) layer, a silicon nitride ($SiN_x$) layer, and a SiON layer are alternately stacked. The buffer layer may be omitted.

Figure 8:
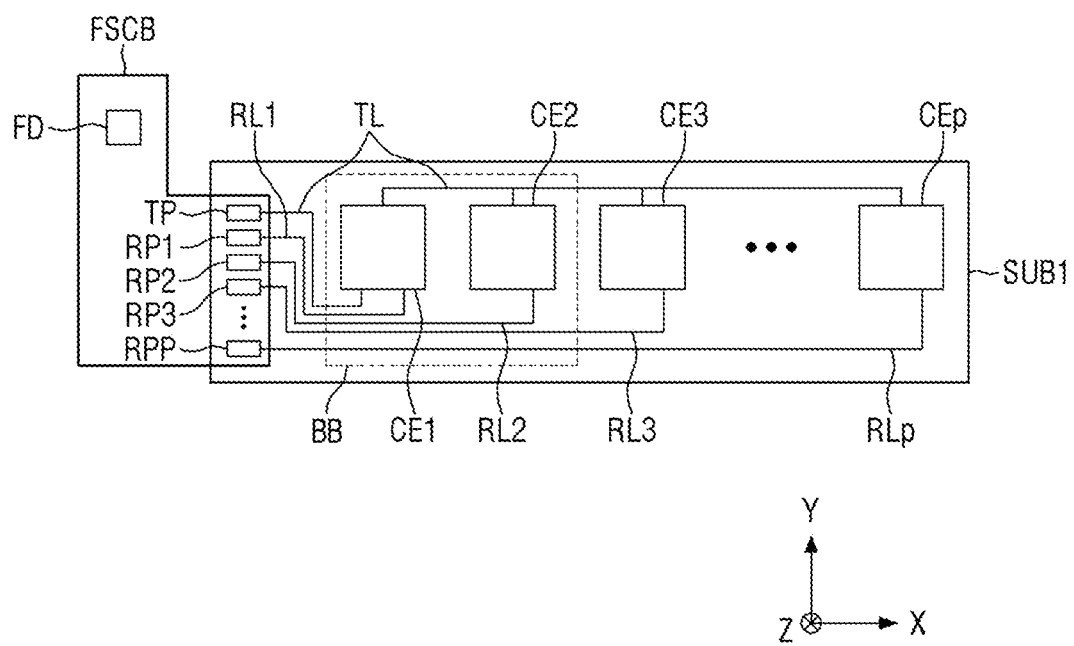
FIG. 8 is a plan view illustrating an example of a pressure sensor included in the display device of FIG. 1.

The thin film transistor 335 is formed on the buffer layer. The thin film transistor 335 includes an active layer 331, a gate electrode 332, a source electrode 333, and a drain electrode 334. FIG. 8 illustrates that the thin film transistor 335 is formed in an upper gate (top gate) method in which the gate electrode 332 is located above the active layer 331, but the present invention is not limited thereto. For example, the thin film transistor 335 may be formed in a lower gate (bottom gate) method in which the gate electrode 332 is located below the active layer 331 or formed in a double gate method in which the gate electrode 332 is located above and below the active layer 331.

The active layer 331 is formed on the buffer layer. The active layer 331 may be formed of a silicon-based semiconductor material or an oxide-based semiconductor material. A light blocking layer for blocking external light incident on the active layer 331 may be formed between the buffer layer and the active layer 331.

The gate insulating layer 336 may be formed on the active layer 331. The gate insulating layer 316 may be formed of an inorganic layer, for example, a $SiO_x$ layer, a $SiN_x$ layer, or a multilayer thereof. The gate electrode 332 and a gate line may be formed on the gate insulating layer 316. The gate electrode 332 and the gate line may be formed of a single layer or a multilayer made of any one among molybdenum (Mo), aluminum (Al), chromium (Cr), gold (Au), titanium (Ti), nickel (Ni), neodymium (Nd), and copper (Cu), or an alloy thereof.

The interlayer insulating layer 337 may be formed on the gate electrode 332 and the gate line. The interlayer insulating layer 337 may be formed of an inorganic layer, for example, a $SiO_x$ layer, a $SiN_x$ layer, or a multilayer thereof.

The source electrode 333, the drain electrode 334, and a data line may be formed on the interlayer insulating layer 337. Each of the source electrode 333 and the drain electrode 334 may be connected to the active layer 331 through a contact hole passing through the gate insulating layer 336 and the interlayer insulating layer 337. The source electrode 333, the drain electrode 334, and the data line may be formed of a single layer or a multilayer made of any one among Mo, Al, Cr, Au, Ti, Ni, Nd, and Cu, or an alloy thereof.

The protective layer 338 for insulating the thin film transistor 335 may be formed on the source electrode 333, the drain electrode 334, and the data line. The protective layer 338 may be formed of an inorganic layer, for example, a $SiO_x$ layer, a $SiN_x$ layer, or a multilayer thereof.

The planarization layer 339 for planarizing a step due to the thin film transistor 335 may be formed on the protective layer 338. The planarization layer 339 may be formed of an organic layer such as acrylic resin, epoxy resin, phenolic resin, polyamide resin, or polyimide resin.

The light-emitting device layer 304 is formed on the thin film transistor layer 303. The light-emitting device layer 304 includes light-emitting devices and a pixel defining layer 344.

The light-emitting devices and the pixel defining layer 344 are formed on the planarization layer 339. The light-emitting device may be an organic light-emitting device. In this case, the light-emitting device may include an anode electrode 341, a light-emitting layer 342, and a cathode electrode 343.

The anode electrode 341 may be formed on the planarization layer 339. The anode electrode 341 may be connected to the source electrode 333 of the thin film transistor 335 through a contact hole passing through the protective layer 338 and the planarization layer 339.

In order to partition the pixels, the pixel defining layer 344 may be formed on the planarization layer 339 to cover an edge of the anode electrode 341. That is, the pixel defining layer 344 serves as a pixel defining layer for defining the pixels. Each of the pixels represents a region in which the anode electrode 341, the light-emitting layer 342, and the cathode electrode 343 are sequentially stacked, and holes from the anode electrode 341 and electrons from the cathode electrode 343 are combined with each other in the light-emitting layer 342 to emit light.

The light-emitting layer 342 is formed on the anode electrode 341 and the pixel defining layer 344. The light-emitting layer 342 may be an organic light-emitting layer. The light-emitting layer 342 may emit one among red light, green light, and blue light. A peak wavelength range of the red light may range from about 620 nm to 750 nm, and a peak wavelength range of the green light may range from about 495 nm to 570 nm. In addition, a peak wavelength range of the blue light may range from about 450 nm to 495 nm. Alternatively, the light-emitting layer 342 may be a white light-emitting layer which emits white light. In this case, the light-emitting layer 342 may have a form in which a red light-emitting layer, a green light-emitting layer, and a blue light-emitting layer are stacked, and the light-emitting layer 342 may be a common layer which is commonly formed in the pixels. In this case, the display panel 30 may further include a separate color filter for displaying red, green, and blue colors.

The light-emitting layer 342 may include a hole transporting layer, a light-emitting layer, and an electron transporting layer. In addition, the light-emitting layer 342 may be formed in a tandem structure of two or more stacks. In this case, a charge generation layer may be formed between the stacks.

The cathode electrode 343 is formed on the light-emitting layer 342. The second electrode 343 may be formed to cover the light-emitting layer 342. The second electrode 343 may be a common layer which is commonly formed in the pixels.

When the light-emitting device layer 304 is formed in a top emission method in which light is emitted upward, the anode electrode 341 may be formed of a metal material having high reflectivity, such as a stacked structure of aluminum and titanium (Ti/Al/Ti), a stacked structure of aluminum and indium tin oxide (ITO) (ITO/Al/ITO), an aluminum-palladium-copper (APC) alloy, and a stacked structure of an APC alloy and ITO (ITO/APC/ITO). The APC alloy is an alloy of silver (Ag), palladium (Pd), and Cu. In addition, the cathode electrode 263 may be formed of a transparent metal material (a transparent conductive material (TCO)) such as ITO or indium zinc oxide (IZO) which allows light to be transmitted therethrough, or a semi-transmissive metal material (a semi-transmissive conductive material) such as magnesium (Mg), Ag, or an alloy of Mg and Ag. When the cathode electrode 343 is formed of a semi-transmissive metal material, light emission efficiency may be increased due to a micro cavity.

When the light-emitting device layer 304 is formed in a bottom emission method in which light is emitted downward, the cathode electrode 263 may be formed of a transparent metal material (TCO) such as ITO or IZO, or a semi-transmissive metal material (a semi-transmissive conductive material) such as Mg, Ag, or an alloy of Mg and Ag. The second electrode 343 may be formed of a metal material having high reflectivity, such as a stacked structure of Ti/Al/Ti, a stacked structure of ITO/Al/ITO, an APC alloy, and a stacked structure of ITO/APC/ITO. When the anode electrode 341 is formed of a semi-transmissive metal material, light emission efficiency may be increased due to a micro cavity.

The encapsulation layer 305 is formed on the light-emitting device layer 304. The encapsulation layer 305 serves to prevent oxygen or moisture from penetrating into the light-emitting layer 342 and the cathode electrode 343. To this end, the encapsulation layer 305 may include at least one inorganic layer. The inorganic layer may be formed of $SiN_x$, aluminum nitride, zirconium nitride, titanium nitride, hafnium nitride, tantalum nitride, $SiO_x$, aluminum oxide, or titanium oxide. In addition, the encapsulation layer 305 may further include at least one organic layer. The organic layer may be formed to have a sufficient thickness so as to prevent particles from passing through the encapsulation layer 305 to enter the light-emitting layer 342 and the cathode electrode 343. The organic layer may include any one among epoxy, acrylate, and urethane acrylate.

The barrier film 306 is arranged on the encapsulation layer 305. The barrier film 306 is arranged to cover the encapsulation layer 305 so as to protect the light-emitting device layer 304 from oxygen or moisture. The barrier film 306 may be integrally formed with the touch sensing device 200.

A polarizing film may be additionally bonded to an upper surface of the display panel 30 to prevent degradation of visibility due to reflection of external light.

In embodiments, the display panel 30 may include a first pixel PX1 arranged in the main display area DA0 and configured to display an image and a second pixel PX2 arranged in the first and second sub-display areas DA1 and DA2 and configured to display an image. Here, the second pixel PX2 may be smaller than the second pixel PX1, and an emission area of the second pixel PX2 may be smaller than an emission area of the first pixel PX1.

Referring to FIG. 6, each of the first pixel PX1 and the second pixel PX2 may emit light having one among a first color R, a second color G, and a third color B. FIG. 6 shows the first pixels PX1 and the second pixels PX2 which are arranged in a stripe structure, but this is illustrative, and the first pixels PX1 and the second pixels PX2 may be arranged in a PenTile structure, a diamond PenTile structure, or the like.

As shown in FIG. 6, the first sub-display area DA1 may further include a transmission area TA through which light is transmitted. In this case, a resolution of the first sub-display area DA1 may be lower than a resolution of the main display area DA0. In addition, when the second pixel PX2 is formed to be smaller than the first pixel PX1, the transmission area TA may be increased.

The transmission area TA may include an opening so as to allow light or ultrasonic waves to pass through the transmission area TA. The opening may be formed in such a way that at least a portion of the insulating layer and a component for light emission are removed. For example, the opening may be formed by removing the interlayer insulating layer 337 (see FIG. 5) and the planarization layer 339 (see FIG. 5). However, the present invention is not limited thereto, and the gate insulating layer 337 (see FIG. 5) may also be removed.

Light emitted from the second pixel PX2 arranged in the first sub-display area DA1 is reflected by a user's finger or the like, and the reflected light may reach the first pressure sensor 100 through the opening of the transmission area TA. When the first pressure sensor 100 (or the touch member 20) further includes an optical sensor, a touch input of the user may be detected using light.

That is, because the transmission area TA is formed in the first sub-display area DA1 (and the second sub-display area DA2) of the display panel 100, an amount of transmitted light is increased so that sensitivity of the touch input of the user may be improved.

FIG. 6 shows that three pixels and one transmission area TA are arranged in one direction, but the present invention is not limited thereto, and the pixels and the transmission area TA may be formed in various shapes and numbers. In addition, although the transmission area TA has been illustrated as a quadrangular shape, the present invention is not limited thereto, and the transmission area TA may be provided in various shapes such as a polygonal shape, a circular shape, and the like.

Figure 7:
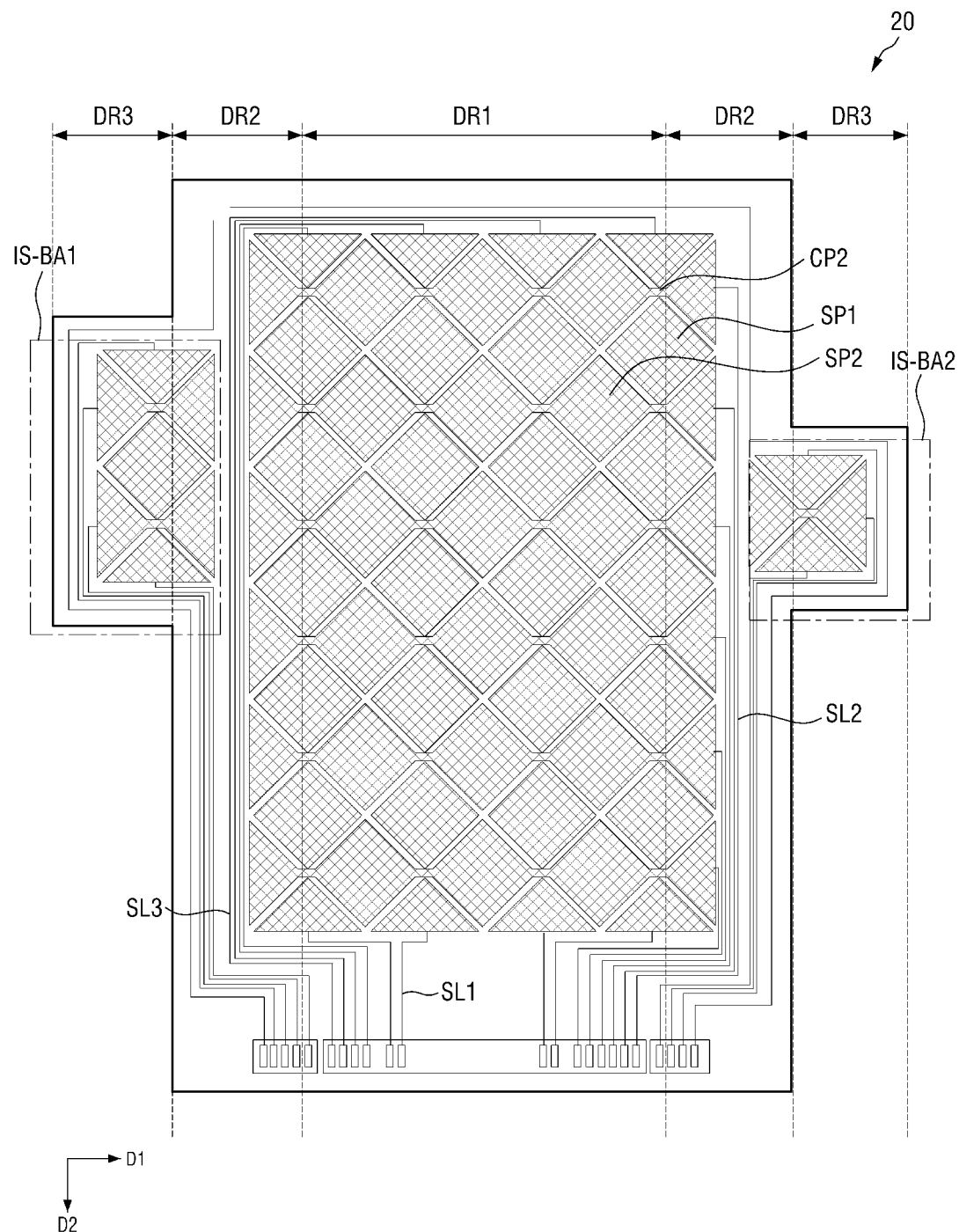
FIG. 7 is a plan view illustrating an example of a touch member included in the display device of FIG. 1.

FIG. 7 is a plan view illustrating an example of a touch member included in the display device of FIG. 1. For convenience of description, FIG. 7 shows the touch member 20 in an unfolded state (or a deployed state).

Referring to FIG. 7, the touch member 20 may include a first sensing electrode SP1 (or a driving electrode), a first sensing signal line SL1 (or a first driving signal line) connected to the first sensing electrode SP1, a third sensing signal line SL3, a second sensing electrode SP2 (or a sensing electrode), a second sensing signal line SL2 (or a sensing signal line) connected to the second sensing electrode SP2, and a pad portion PADa connected to the first to third sensing signal lines SL1, SL2, and SL3 In addition, the touch member 20 may further include reference lines arranged along an outer circumference of the touch member 20 (for example, a ground line for preventing an influx of static electricity and a guard line).

Each of the first and second sensing electrodes SP1 and SP2 may have a mesh shape in which a plurality of sensing openings are defined. The first sensing electrode SP1 may be connected to another first sensing electrode through a first connection portion (not shown), may extend in the second direction D2, and may be repeatedly arranged in the first direction D1. The first connection portion connects two adjacent first sensing electrodes SP1. Each of the first and third sense signal lines SL1 and SL3 may also have a mesh shape.

The second sensing electrode SP2 is insulated from the first sensing electrode SP1 and crosses the first sensing electrode SP1. The second sensing electrode SP2 may be connected to another second sensing electrode through a second connection portion CP2, may extend in the first direction D1, and may be repeatedly arranged in the second direction D2. The second connection portion CP2 connects two adjacent second sensing electrodes SP2. The second sensing signal line SL2 may also have a mesh shape.

The first sensing electrode SP1 is electrostatically coupled to the second sensing electrode SP2. When sensing signals are applied to the first sensing electrode SP1, capacitors are formed between the first sensing electrode SP1 and the second sensing electrode SP2.

In embodiments, the touch member 20 may include the first and second sensing electrodes SP1 and SP2 which are arranged in a first sub-sensing area IS-BA1 and a second sub-sensing area IS-BA2. The first sub-sensing area IS-BA1 may correspond to the first sub-sensing portion 20P1 (see FIG. 2) but may not coincide therewith. Similarly, the second sub-sensing area IS-BA2 may correspond to the second sub-sensing portion 20P2 (see FIG. 2) but may not coincide therewith.

As shown in FIG. 7, the first and second sensing electrodes SP1 and SP2 arranged in the first sub-sensing area IS-BA1 (and the first and second sensing electrodes SP1 and SP2 arranged in the second sub-sensing area IS-BA2) may independently operate without being connected to sensing electrodes arranged in another area. In this case, the third sensing signal line SL3 may be arranged to cross between the first sub-sensing area IS-BA1 and the second sub-sensing area IS-BA2 in the second direction D2. In this case, a non-sensing area (or a dead space) formed along an outer circumference of the first sub-sensing area IS-BA1 may be reduced. Similarly, the second sensing signal line SL2 may also be arranged to cross between the first sub-sensing area IS-BA1 and the second sub-sensing area IS-BA2 in the second direction D2.

Meanwhile, although the first sub-sensing area IS-BA1 and the second sub-sensing area IS-BA2 have been illustrated as being formed independently in different configurations in FIG. 7, the present invention is not limited thereto. For example, the second electrodes SP2 located in the same row may be interconnected from the first sub-sensing area IS-BA1 to the second sub-sensing area IS-BA2 in the first direction D1.

In addition, although an example of the first sensing sensor portions SP1 and the second sensing sensor portions SP2 having a rhombic shape have been illustrated in FIG. 7, the present invention is not limited thereto.

Figure 9:
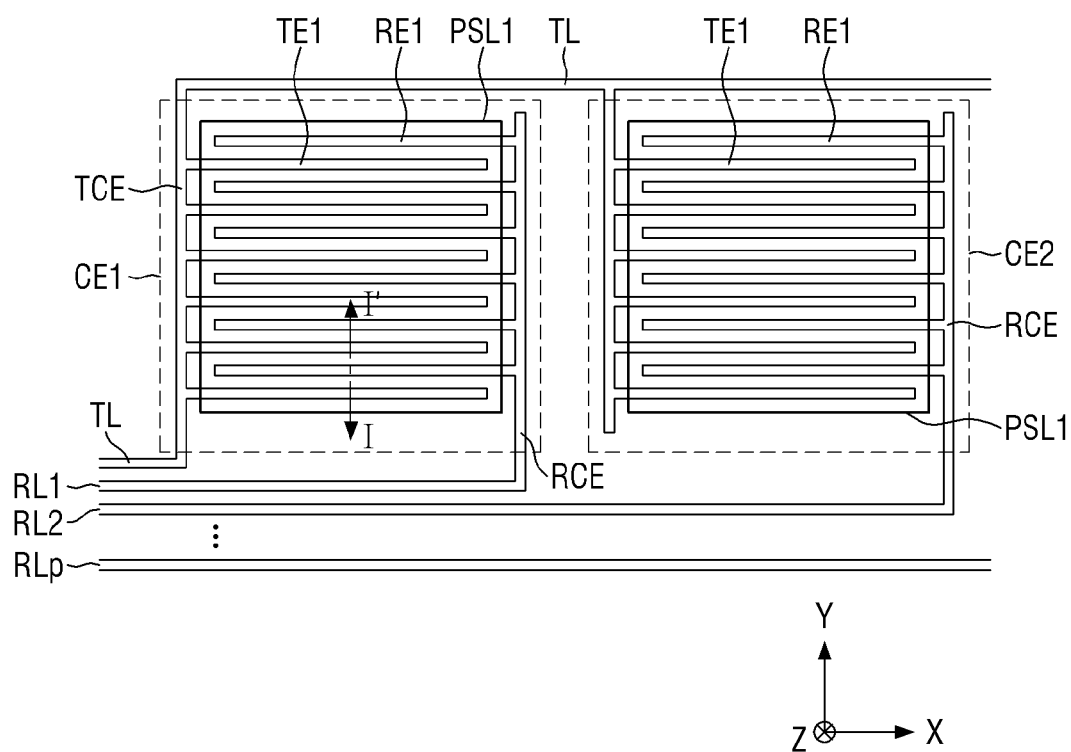
FIG. 9 is a diagram illustrating an example of Area BB of FIG. 8.
Figure 10A:
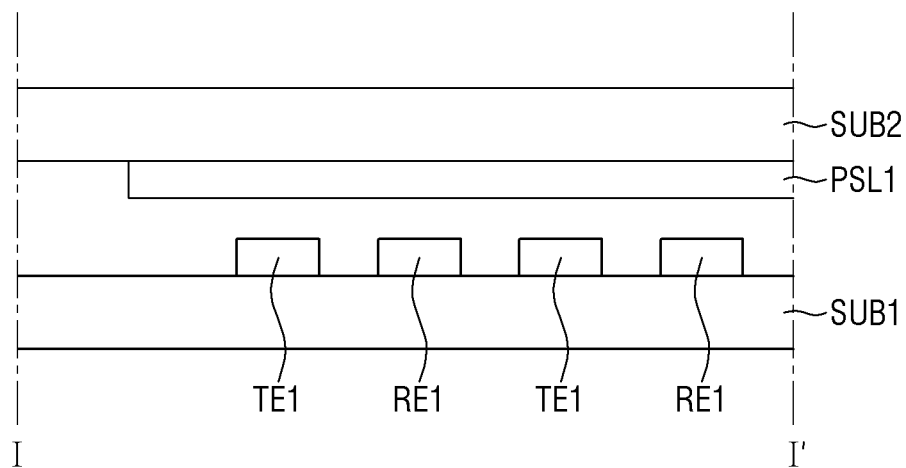
FIG. 10A is a cross-sectional view illustrating an example of the pressure sensor taken along the line I-I' of FIG. 9.
Figure 10B:
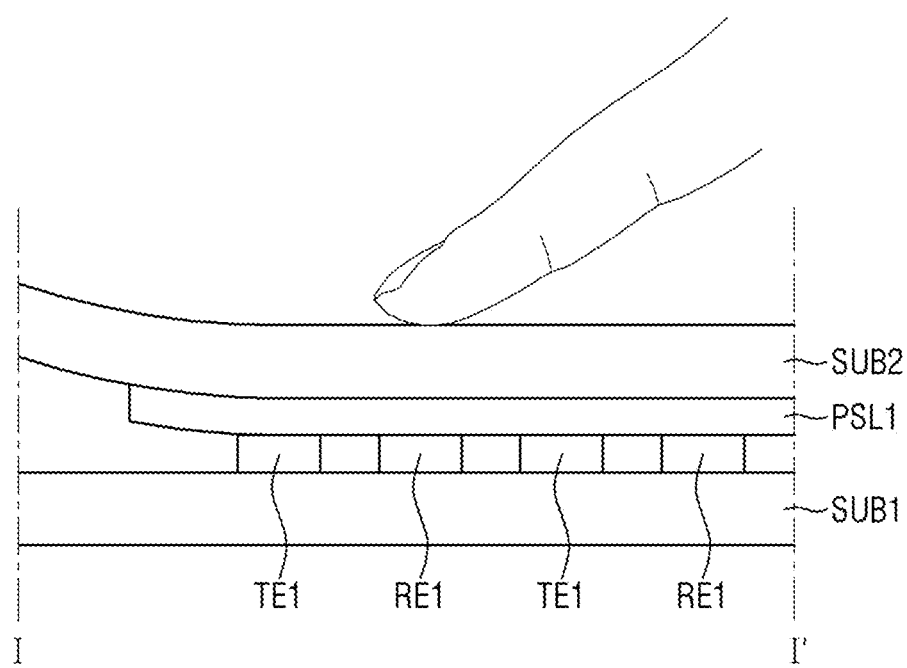
FIG. 10B is a cross-sectional view illustrating the pressure sensor in a pressed state.
Figure 11:
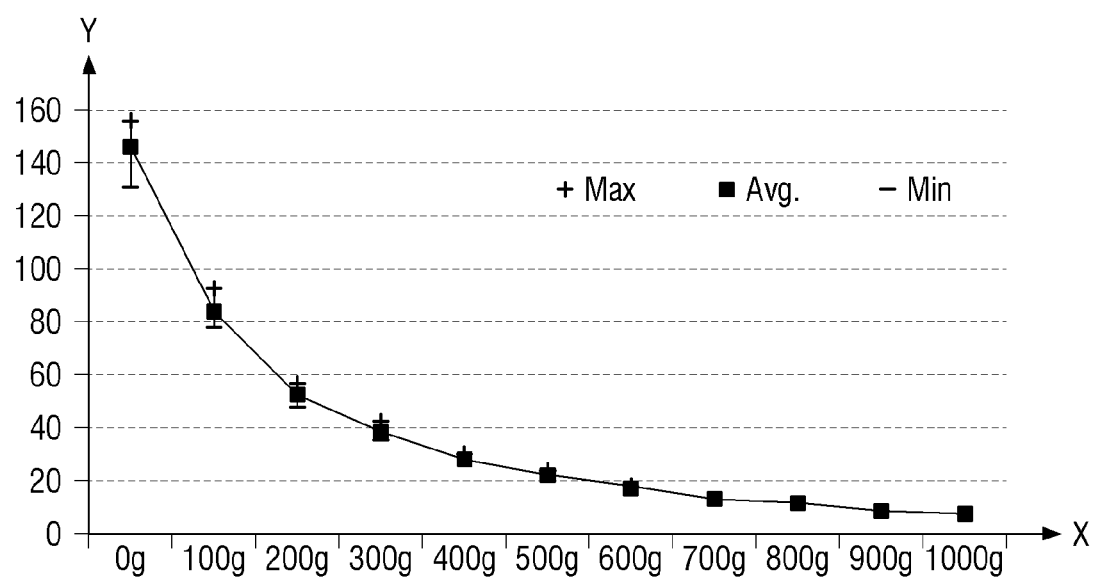
FIG. 11 is a graph showing a resistance value of a pressure sensing cell according to a weight applied to the pressure sensor of FIG. 8.

FIG. 8 is a plan view illustrating an example of the pressure sensor included in the display device of FIG. 1. FIG. 9 is a diagram illustrating an example of Area BB of FIG. 8. FIG. 10A is a cross-sectional view illustrating an example of the pressure sensor taken along the line I-I' of FIG. 9. FIG. 10B is a cross-sectional view illustrating the pressure sensor in a pressed state. FIG. 11 is a graph showing a resistance value of a pressure sensing cell according to a weight applied to the pressure sensor of FIG. 8.

Hereinafter, because positions of components of a pressure sensor are varied according to arrangement positions of the pressure sensors 100 and 200, the pressure sensors 100 and 200 will be described based on direction axes X, Y, and Z which are set with respect to the pressure sensor. Meanwhile, because the second pressure sensor 200 is substantially the same as or similar to the first pressure sensor 100, except for a size of the second pressure sensor 200, the first pressure sensor 100 will be described.

Referring to FIG. 8, the first pressure sensor 100 may have a shape extending in one direction, for example, an X-axis direction, (e.g., the first direction D1 shown in FIG. 1) when viewed in the plan view. In this case, the first pressure sensor 100 may have a length in the extending direction that is greater than a width. However, a shape of the first pressure sensor 100 is not limited thereto and may be varied according to a position at which the first pressure sensor 100 is applied.

The first pressure sensor 100 includes a first substrate SUB1, a second substrate SUB2, a drive line TL, first to $p^{th}$ sensing lines RL1 to RLp (p is an integer that is greater than or equal to 2), a drive pad TP, first to $p^{th}$ sensing pads RP1 to RPp, and pressure sensing cells CE1 to CEp.

The first substrate SUB1 and the second substrate SUB2 are arranged to face each other. Each of the first substrate SUB1 and the second substrate SUB2 may include a polyethylene-based material, a polyimide-based material, a polycarbonate-based material, a polysulfone-based material, a polyacrylate-based material, a polystyrene-based material, a polyvinyl chloride-based material, a polyvinyl alcohol-based material, a polynorbornene-based material, or a polyester-based material. In one embodiment, each of the first substrate SUB1 and the second substrate SUB2 may be formed of a PET layer or a polyimide layer.

The pressure sensing cells CE1 to CEp are arranged between the first substrate SUB1 and the second substrate SUB2. The drive line TL, the first to $p^{th}$ sensing lines RL1 to RLp, the drive pad TP, and the first to $p^{th}$ sensing pads RP1 to RPp are arranged on one surface of the first substrate SUB1 facing the second substrate SUB2. The pressure sensing cells CE1 to CEp are arranged between the first substrate SUB1 and the second substrate SUB2.

Each of the pressure sensing cells CE1 to CEp may independently detect a pressure of a corresponding position. Although the pressure sensing cells CE1 to CEp have been illustrated as being arranged in one row in FIG. 8, the present invention is not limited thereto. The pressure sensing cells CE1 to CEp may be arranged in a plurality of rows, as necessary. In addition, as shown in FIG. 8, the pressure sensing cells CE1 to CEp may be spaced apart from each other by a predetermined interval or may be consecutively arranged.

The pressure sensing cells CE1 to CEp may have different areas according to use. For example, as shown in FIG. 8, when the pressure sensing cells CE1 to CEp are used as a physical button, such as a volume control button arranged on a side surface of the display device 1, the pressure sensing cells CE1 to CEp may be formed to have an area similar to an area of the physical button. In addition, although not shown in the drawings, when the pressure sensing cells CE1 to CEp are used to detect a pressure applied to a front surface of the display device 1, the pressure sensing cells CE1 to CEp may be formed to have a size corresponding to a pressure sensing area.

Each of the pressure sensing cells CE1 to CEp may be connected to at least one drive line and at least one sensing line. For example, as shown in FIG. 8, the pressure sensing cells CE1 to CEp are commonly connected to one drive line TL, whereas the pressure sensing cells CE1 to CEp may be connected one-to-one to the sensing lines RL1 to RLp. The first pressure sensing cell CE1 may be connected to the drive line TL and the first sensing line RL1, and the second pressure sensing cell CE2 may be connected to the drive line TL and the second sensing line RL2. In addition, the third pressure sensing cell CE3 may be connected to the drive line TL and the third sensing line RL3, and the $p^{th}$ pressure sensing cell CEp may be connected to the drive line TL and the $p^{th}$ sensing line RLp.

The drive line TL may be connected to the drive pad TP, and the first to $p^{th}$ sensing lines RL1 to RLp may be connected one-to-one to the first to $p^{th}$ sensing pads RP1 to RPp. The first sensing line RL1 may be connected to the first sensing pad RP1, the second sensing line RL2 may be connected to the second sensing pad RP2, the third sensing line RL3 may be connected to the third sensing pad RP3, and the $p^{th}$ sensing line RLp may be connected to the $p^{th}$ sensing pad RPp. The drive pad TP and the first to $p^{th}$ sensing pads RP1 to RPp may be arranged on one side of the first substrate SUB1 and connected to a pressure sensing circuit board FSCB through an anisotropic conductive film.

The pressure sensing circuit board FSCB may include a pressure detector FD. The pressure detector FD may apply a driving voltage to the drive line TL through the drive pad TP and detect current values or voltage values from the sensing lines RL1 to RLp through the sensing pads RP1 to RPp, thereby detecting a pressure applied to the pressure sensing cells CE1 to CEp. The pressure detector FD may be mounted on the pressure sensing circuit board FSCB or mounted on another circuit board connected to the pressure sensing circuit board FSCB. When the pressure detector FD is mounted on another circuit board connected to the pressure sensing circuit board FSCB, the pressure detector FD may be integrated with a driver which performs a different function. For example, the pressure detector FD may be integrated with a drive circuit mounted on the second flexible circuit board 21 of the touch member 20 shown in FIG. 2 or mounted on the first flexible circuit board 31 of the display panel 30.

The first pressure sensor 100 may further include a bonding layer which is located between the first substrate SUB1 and the second substrate SUB2 and bonds the first substrate SUB1 to the second substrate SUB2. The bonding layer may be formed of a pressure-sensitive adhesive layer or an adhesive layer. The bonding layer may be arranged along peripheries of the first substrate SUB1 and the second substrate SUB2. In one embodiment, the bonding layer may completely surround edges of the first substrate SUB1 and the second substrate SUB2 and serve to seal an interior of the first pressure sensor 100. In addition, the bonding layer may serve as a spacer for consistently maintaining a gap between the first substrate SUB1 and the second substrate SUB2. The bonding layer may not overlap the drive line TL, the sensing lines RL1 to RLp, the pressure sensing cells CE1 to CEp, the drive pad TP, and the sensing pads RP1 to RPp.

The bonding layer may be first bonded to one surface of the first substrate SUB1 or the second substrate SUB2 and then bonded to one surface of the other substrate during the bonding process of the first substrate SUB1 and the second substrate SUB2. Alternatively, the bonding layer may be provided on one surface of each of the first substrate SUB1 and the second substrate SUB2, and the bonding layer of the first substrate SUB1 and the bonding layer of the second substrate SUB2 may be mutually bonded during the bonding process of the first substrate SUB1 and the second substrate SUB2.

Referring to FIG. 9, each of the pressure sensing cells CE1 to CEp includes a driving connection electrode TCE, a sensing connection electrode RCE, a first driving electrode TE1, a first sensing electrode RE1, and a first pressure sensing layer PSL1.

The driving connection electrode TCE, the sensing connection electrode RCE, the first driving electrode TE1, and the first sensing electrode RE1 are arranged on the first substrate SUB1 facing the second substrate SUB2.

The driving connection electrode TCE is connected to the drive line TL and the first driving electrode TE1. Specifically, the driving connection electrode TCE is connected to the drive line TL at both ends thereof in a length direction (a Y-axis direction). The first driving electrodes TE1 may branch off in a width direction (an X-axis direction) of the driving connection electrode TCE.

The sensing connection electrode RCE is connected to one among the sensing lines RL1 to RLp and the first sensing electrode RE1. Specifically, the sensing connection electrode TCE is connected to any one among the sensing lines RL1 to RLp at one end thereof in the length direction (the Y-axis direction). The first sensing electrodes RE1 may branch off in the width direction of the sensing connection electrode RCE (the X-axis direction).

The first driving electrode TE1 may be arranged to be coplanar with the first sensing electrode RE1. The first driving electrode TE1 and the first sensing electrode RE1 may be made of the same material. For example, each of the first driving electrode TE1 and the first sensing electrode RE1 may include a conductive material such as Ag, Cu, or the like. The first driving electrode TE1 and the first sensing electrode RE1 may be formed on the first substrate SUB1 through a screen-printing method.

The first driving electrodes TE1 and the first sensing electrodes RE1 are arranged adjacent to each other but are not connected to each other. The first driving electrodes TE1 may be arranged in parallel with the first sensing electrodes RE1. The first driving electrodes TE1 and the first sensing electrodes RE1 may be alternately arranged in the length direction (the Y-axis direction) of the driving connection electrode TCE and the sensing connection electrode RCE. That is, the first driving electrode TE1, the first sensing electrode RE1, the first driving electrode TE1, and the first sensing electrode RE1 may be repeatedly arranged in this order in the length direction (the Y-axis direction) of the driving connection electrode TCE and the sensing connection electrode RCE.

As shown in FIG. 10A, the first pressure sensing layer PSL1 is arranged on one surface of the second substrate SUB2 facing the first substrate SUB1. The first pressure sensing layer PSL1 may be arranged to overlap the first driving electrodes TE1 and the first sensing electrodes RE1.

The first pressure sensing layer PSL1 may contain a pressure sensitive material and polymer resin on which the pressure sensitive material is located. The pressure sensitive material may be metal fine particles (or metal nanoparticles) of nickel, aluminum, titanium, tin, or copper. For example, the first pressure sensing layer PSL1 may be a quantum tunneling composite (QTC).

When pressure is not applied to the second substrate SUB2 in a height direction of the first pressure sensor 100 (the Z-axis direction), a gap is present between the first pressure sensing layer PSL1 and the first driving electrodes TE1 and between the first pressure sensing layer PSL1 and the first sensing electrodes RE1. That is, when pressure is not applied to the second substrate SUB2, the first pressure sensing layer PSL1 is spaced apart from the first driving electrodes TE1 and the first sensing electrodes RE1.

Referring to FIG. 10B, when pressure is applied to the second substrate SUB2 in the height direction of the first pressure sensor 100 (the Z-axis direction), the first pressure sensing layer PSL1 comes into contact with the first driving electrodes TE1 and the first sensing electrodes RE1. Thus, the first driving electrode TE1 and the first sensing electrode RE1 may be physically connected through the first pressure sensing layer PSL1, and the first pressure sensing layer PSL1 may act as electrical resistance.

Referring to FIG. 11, when an object having a weight ranging from 0 g to 1000 g is placed on the second substrate SUB2 of the first pressure sensor 100, a variation in resistance value of the pressure sensing cell is shown. In FIG. 11, an X-axis indicates a weight of the object placed on the second substrate SUB2, and a Y-axis indicates a resistance value of the pressure sensing cell.

The pressure detector FD may apply a driving voltage to the drive line TL of the first pressure sensor 100 and then detect a current or voltage of the sensing line of the first pressure sensor 100, thereby calculating a resistance value of the pressure sensing cell connected to the sensing line of the first pressure sensor 100.

As shown in FIG. 10A, when the object is not placed on the second substrate SUB2 of the first pressure sensor 100 (0 g), a gap is present between the first pressure sensing layer PSL1 and the first driving electrode TE1 and between the first pressure sensing layer PSL1 and the first sensing electrode RE1. Consequently, no voltage is applied to or no current flows to the first sensing electrodes RE1. Therefore, the resistance value of the pressure sensing cell is approximately 145 kΩ which is extremely high.

As the weight of the object placed on the second substrate SUB2 of the first pressure sensor 100 is increased, an area of the first pressure sensing layer PSL1 in contact with the first driving electrodes TE1 and the first sensing electrodes RE1 is increased. Consequently, as the weight of the object placed on the second substrate SUB2 of the first pressure sensor 100 is increased, an amount of current flowing from the first driving electrodes TE1 to the first sensing electrodes RE1 through the first pressure sensing layer PSL1 is increased. Thus, as shown in FIG. 11, as the weight of the object placed on the second substrate SUB2 of the first pressure sensor 100 is increased, the resistance value of the pressure sensing cell is decreased.

In addition, as the weight of the object placed on the second substrate SUB2 of the first pressure sensor 100 is increased, a degree of scattering of the resistance value of the pressure sensing cell is decreased. Specifically, when the object is not placed on the second substrate SUB2 of the first pressure sensor 100 (0 g), the degree of scattering of the resistance value of the pressure sensing cell ranges from 130 kΩ to 155 kΩ, i.e., approximately 25 kΩ. In addition, when an object of 100 g is placed on the second substrate SUB2 of the first pressure sensor 100, the degree of scattering of the resistance value of the pressure sensing cell ranges from 75 kΩ to 90 kΩ, i.e., approximately 15 kΩ. In addition, when an object of 200 g is placed on the second substrate SUB2 of the first pressure sensor 100, the degree of scattering of the resistance value of the pressure sensing cell ranges from 45 kΩ to 55 kΩ, i.e., approximately 10 kΩ. In addition, when an object of 300 g is placed on the second substrate SUB2 of the first pressure sensor 100, the degree of scattering of the resistance value of the pressure sensing cell ranges from 35 kΩ to 42 kΩ, i.e., approximately 7 kΩ. In addition, when an object of 400 g or more is placed on the second substrate SUB2 of the first pressure sensor 100, the degree of scattering of the resistance value of the pressure sensing cell is less than or equal to 5 kΩ.

As described with reference to FIGS. 8 to 11, in the first pressure sensor 100, the area of the first pressure sensing layer PSL1 in contact with the first driving electrodes TE1 and the first sensing electrodes RE1 is varied according to the applied pressure so that the resistance value of the pressure sensing cell may be varied. Consequently, the first pressure sensor 100 may detect a pressure pressed by the user's hand.

Figure 12:
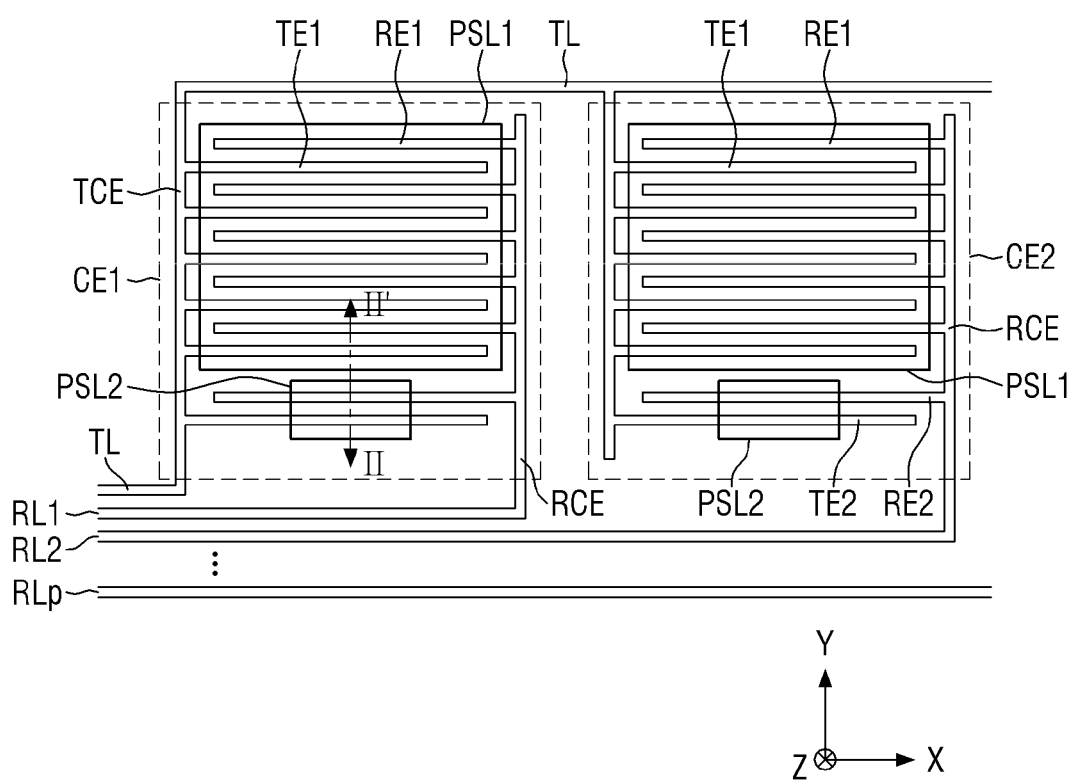
FIG. 12 is a diagram illustrating another example of Area BB of FIG. 8.
Figure 13:
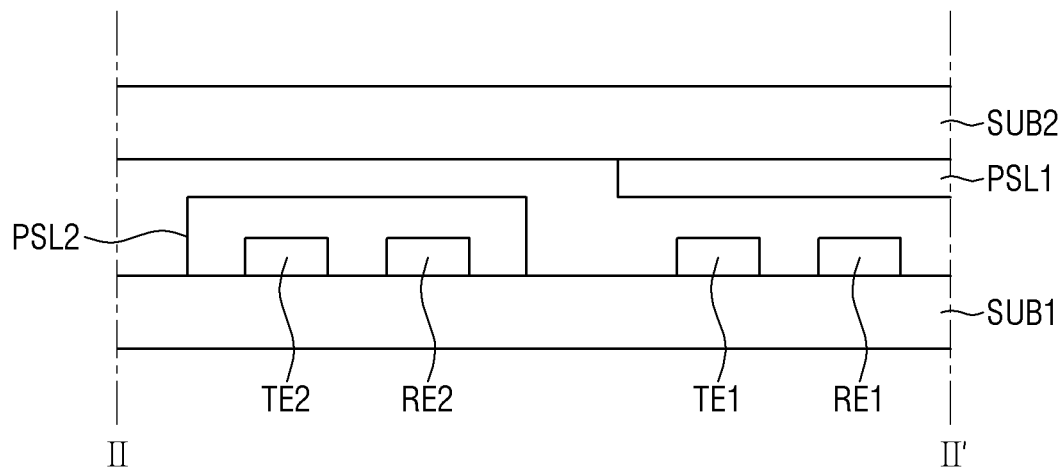
FIG. 13 is a cross-sectional view illustrating an example of the pressure sensor taken along the line II-II' of FIG. 12.
Figure 13:
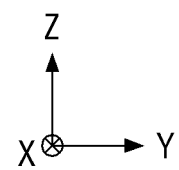
Figure 14:
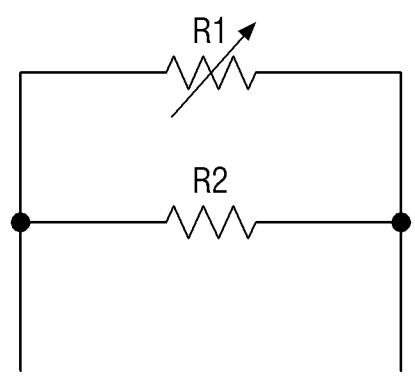
FIG. 14 is a circuit diagram illustrating the pressure sensor of FIG. 12.
Figure 15:
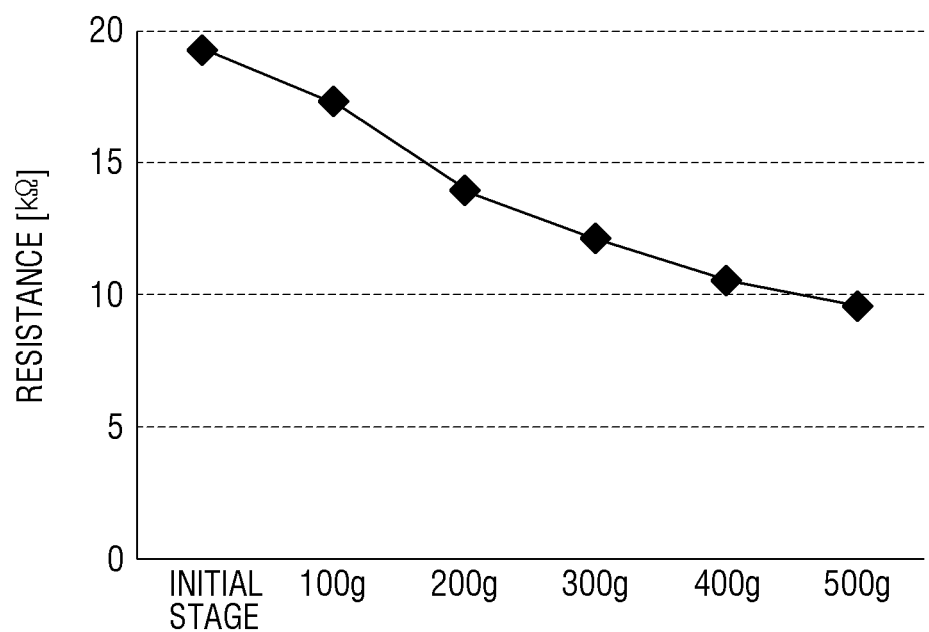
FIG. 15 is a graph showing a resistance value of a pressure sensing cell according to a weight applied to the pressure sensor of FIG. 12.

FIG. 12 is a diagram illustrating another example of Area BB of FIG. 8. FIG. 13 is a cross-sectional view illustrating an example of the pressure sensor taken along the line II-II' of FIG. 12. FIG. 14 is a circuit diagram illustrating the pressure sensor of FIG. 12. FIG. 15 is a graph showing a resistance value of a pressure sensing cell according to a weight applied to the pressure sensor of FIG. 12.

Referring to FIGS. 12 and 13, there is a difference from the embodiment shown in FIG. 9 in that each of the pressure sensing cells CE1 to CEp further includes a second driving electrode TE2, a second sensing electrode RE2, and a second pressure sensing layer RPL2. In FIGS. 12 and 13, descriptions overlapping the embodiment shown in FIG. 9 will be omitted herein.

The second driving electrode TE2 and the second sensing electrode RE2 are arranged on one surface of the first substrate SUB1 facing the second substrate SUB2. Although one second driving electrode TE2 and one second sensing electrode RE2 have been illustrated in FIGS. 12 and 13, the embodiment shown in FIGS. 12 and 13 is not limited thereto. For example, a plurality of second driving electrodes TE2 and a plurality of second sensing electrodes RE2 may be arranged on one surface of the first substrate SUB1 facing the second substrate SUB2.

The second driving electrode TE2 may branch off in the width direction of the driving connection electrode TCE (the X-axis direction). The second driving electrode TE2 may be arranged parallel to the first driving electrode TE1.

The second sensing electrode RE2 may branch off in the width direction of the sensing connection electrode RCE (the X-axis direction). The second sensing electrode RE2 may be arranged parallel to the first sensing electrode RE1.

The second driving electrode TE2 and the second sensing electrode RE2 may be arranged to be coplanar with the first driving electrode TE1 and the first sensing electrode RE1. The second driving electrode TE2 and the second sensing electrode RE2 may be made of the same material as the first driving electrode TE1 and the first sensing electrode RE1. For example, each of the second driving electrode TE2 and the second sensing electrode RE2 may include a conductive material such as Ag, Cu, or the like. The second driving electrode TE2 and the second sensing electrode RE2 may be formed on the first substrate SUB1 through a screen-printing method.

The second driving electrode TE2 and the second sensing electrode RE2 are arranged adjacent to each other but are not connected to each other. The second driving electrode TE2 may be arranged parallel to the second sensing electrode RE2.

The second driving electrode TE2 and the second sensing electrode RE2 may not overlap the first pressure sensing layer PSL1. The second sensing electrode RE2 may be arranged between the second driving electrode TE2 and the first driving electrode TE1. In this case, a distance between the second driving electrode TE2 and the second sensing electrode RE2 may be shorter than a distance between the first driving electrode TE1 and the second sensing electrode RE2.

The second pressure sensing layer PSL2 may be in contact with the second driving electrode TE2 and the second sensing electrode RE2. That is, the second driving electrode TE2 and the second sensing electrode RE2 may be connected through the second pressure sensing layer PSL2.

As shown in FIG. 12, the second pressure sensing layer PSL2 may be arranged to cover the second driving electrode TE2 and the second sensing electrode RE2. The second pressure sensing layer PSL2 may be arranged to cover top surfaces and side surfaces of the second driving electrode TE2 and the second sensing electrode RE2. The second pressure sensing layer PSL2 may not overlap the first pressure sensing layer PSL1.

The second pressure sensing layer PSL2 may be formed of the same material as the first pressure sensing layer PSL1. In this case, the second pressure sensing layer PSL2 may contain a pressure sensitive material and polymer resin on which the pressure sensitive material is arranged. The pressure sensitive material may be metal fine particles of nickel, aluminum, titanium, tin, or Cu. For example, the second pressure sensing layer PSL2 may be a QTC.

Referring to FIG. 14, the first pressure sensing cell CE1 may be expressed as including a first resistor R1 and a second resistor R2 which are connected in parallel between the drive line TL and the first sensing line RL1. The first resistor R1 has resistance generated due to the first pressure sensing layer PSL1 arranged between the first driving electrodes TE1 and the first sensing electrodes RE1, and the second resistor R2 has resistance generated due to the second pressure sensing layer PSL2 arranged between the second driving electrode TE2 and the second sensing electrode RE2. Because the contact area of the first pressure sensing layer PSL1 in contact with the first driving electrodes TE1 and the first sensing electrodes RE1 is varied according to pressure, the first resistor R1 corresponds to a variable resistor. In this case, the resistance of the resistor R of the first pressure sensing cell CE1 may be calculated as in Equation 1.

$$\frac{1}{R} = \frac{1}{R1} + \frac{1}{R2} \quad \text{[Equation 1]}$$

Equation 1 may be summarized as in Equation 2.

$$R = \frac{R1 \times R2}{R1 + R2} \quad \text{[Equation 2]}$$

In addition, a resistance variation ΔR of the first pressure sensing cell CE1 due to the resistance variation in first resistor R1 may be calculated as in Equation 3.

$$\Delta R = R2 - R = \frac{R2^2}{R1 + R2} \quad \text{[Equation 3]}$$

Because a circuit diagram of each of the second to $p^{th}$ pressure sensing cells CE2 to CEp may be shown substantially the same as the circuit diagram of the first pressure sensing cell CE1 shown in FIG. 14, the resistance of the resistor R and a resistance change ΔR of each of the second to $p^{th}$ pressure sensing cells CE2 to CEp may also be substantially calculated the same as in Equations 1 to 3.

Each of the first to $p^{th}$ pressure sensing cells CE1 to CEp may include the first resistor R1 of which resistance is varied according to a pressure applied by the first pressure sensing layer PSL1, and the second resistor R2 which is defined by the second pressure sensing layer PSL2 in contact with the second driving electrode TE2 and the second sensing electrode RE2. That is, because each of the first to $p^{th}$ pressure sensing cells CE1 to CEp includes the second resistor R2 irrespective of the applied pressure, the resistance of the resistor R of each of the first to $p^{th}$ pressure sensing cells CE1 to CEp may be decreased.

Meanwhile, the second driving electrode TE2 and the second sensing electrode RE2 are electrodes which are connected to the second pressure sensing layer PSL2 to form the second resistor R2, and thus the number of second driving electrodes TE2 and the number of second sensing electrodes RE2 need not be large. On the other hand, because the first driving electrode TE1 and the first sensing electrode RE1 are electrodes which detect a pressure according to an area in contact with the first pressure sensing layer PSL1, it is preferable that a plurality of first driving electrodes TE1 and a plurality of first sensing electrodes RE1 are formed. The number of second driving electrodes TE2 may be smaller than the number of first driving electrodes TE1, and the number of second sensing electrodes RE2 may be smaller than the number of first sensing electrodes RE1.

In addition, as a thickness of the second driving electrode TE2 and a thickness of the second sensing electrode RE2 becomes thicker, the resistance of the second resistor R2 may become smaller. In addition, as a width of the second driving electrode TE2 and a width of the second sensing electrode RE2 become wider, the resistance of the second resistor R2 may become smaller. In addition, as the number of second driving electrodes TE2 and the number of second sensing electrodes RE2 in contact with the second pressure sensing layer PSL2 are increased, the contact area between the second pressure sensing layer PSL2 and the second driving electrodes TE2 and the contact area between the second pressure sensing layer PSL2 and the second sensing electrodes RE2 are increased so that the resistance of the second resistor R2 may become smaller. In addition, as the area of the second pressure sensing layer PSL2 in contact with the second driving electrode TE2 and the second sensing electrode RE2 is increased, the resistance of the second resistor R2 may become smaller. Therefore, a size of the second resistor R2 may be designed in consideration of the thickness of the second driving electrode TE, the thickness of the second sensing electrode RE2, the width of the second driving electrode TE, the width of the second sensing electrode RE2, the number of the second driving electrodes TE2, the number of the second sensing electrodes RE2, and the area of the second pressure sensing layer PSL2 in contact with the second driving electrode TE2 and the second sensing electrode RE2.

Referring to FIG. 15, when an object having a weight ranging from 0 g to 500 g is placed on the second substrate SUB2 of the first pressure sensor 100, a variation in resistance value of the pressure sensing cell is shown. In FIG. 15, an X-axis indicates a weight of the object placed on the second substrate SUB2, and a Y-axis indicates a resistance value of the pressure sensing cell. The pressure detector FD may apply a driving voltage to the drive line TL of the first pressure sensor 100 and then detect a current or voltage of the sensing line of the first pressure sensor 100, thereby calculating a resistance value of the pressure sensing cell connected to the sensing line of the first pressure sensor 100.

When an object is not placed on the second substrate SUB2 of the first pressure sensor 100 (0 g), a resistance value of the pressure sensing cell is approximately 19 kΩ. As a weight of the object placed on the second substrate SUB2 of the first pressure sensor 100 is increased, because an area of the first pressure sensing layer PSL1 in contact with the first driving electrodes TE1 and the first sensing electrodes RE1 is increased, an amount of current flowing from first driving electrodes TE1 to the first sensing electrodes RE1 through the first pressure sensing layer PSL1 is increased. Thus, as the weight of the object placed on the second substrate SUB2 of the first pressure sensor 100 is increased, the resistance value of the pressure sensing cell is decreased. For example, as shown in FIG. 8, the resistance value of the pressure sensing cell is approximately 17 kΩ when the weight of the object placed on the second substrate SUB2 of the first pressure sensor 100 is 100 g, the resistance value of the pressure sensing cell is approximately 14 kΩ when the weight of the object placed on the second substrate SUB2 of the first pressure sensor 100 is 200 g, the resistance value of the pressure sensing cell is approximately 12 kΩ when the weight of the object placed on the second substrate SUB2 of the first pressure sensor 100 is 300 g, the resistance value of the pressure sensing cell is approximately 11 kΩ when the weight of the object placed on the second substrate SUB2 of the first pressure sensor 100 is 400 g, and the resistance value of the pressure sensing cell is approximately 9 kΩ when the weight of the object placed on the second substrate SUB2 of the first pressure sensor 100 is 500 g.

As described with reference to FIGS. 9 to 11, in the case in which the object is not placed on the second substrate SUB2 of the first pressure sensor 100 (0 g), and the case in which the weight of the object placed on the second substrate SUB2 is 500 g, a difference between the resistance values of the pressure sensing cell is only about 10 kΩ. In comparison, as described with reference to FIGS. 12 to 15, in the case in which the object is not placed on the second substrate SUB2 of the first pressure sensor 100 (0 g), and the case in which the weight of the object placed on the second substrate SUB2 is 500 g, a difference between the resistance values of the pressure sensing cell is about 130 kΩ. Consequently, according to the embodiment shown in FIGS. 12 and 13, a range of the resistance value of the pressure sensing cell, which is to be detected by the pressure detector FD, may be significantly reduced and the manufacturing costs of the pressure detector FD may also be reduced.

Figure 16A:
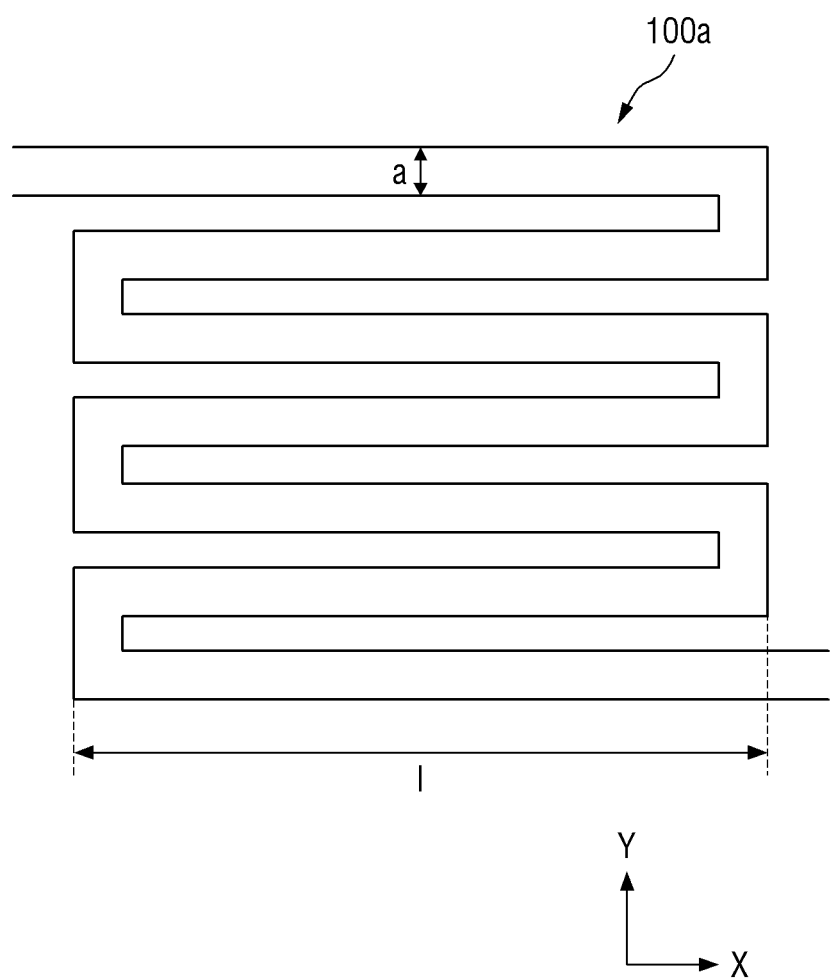
FIGS. 16A and 16B are plan views illustrating another example of the pressure sensor included in the display device of FIG. 1.
Figure 16B:
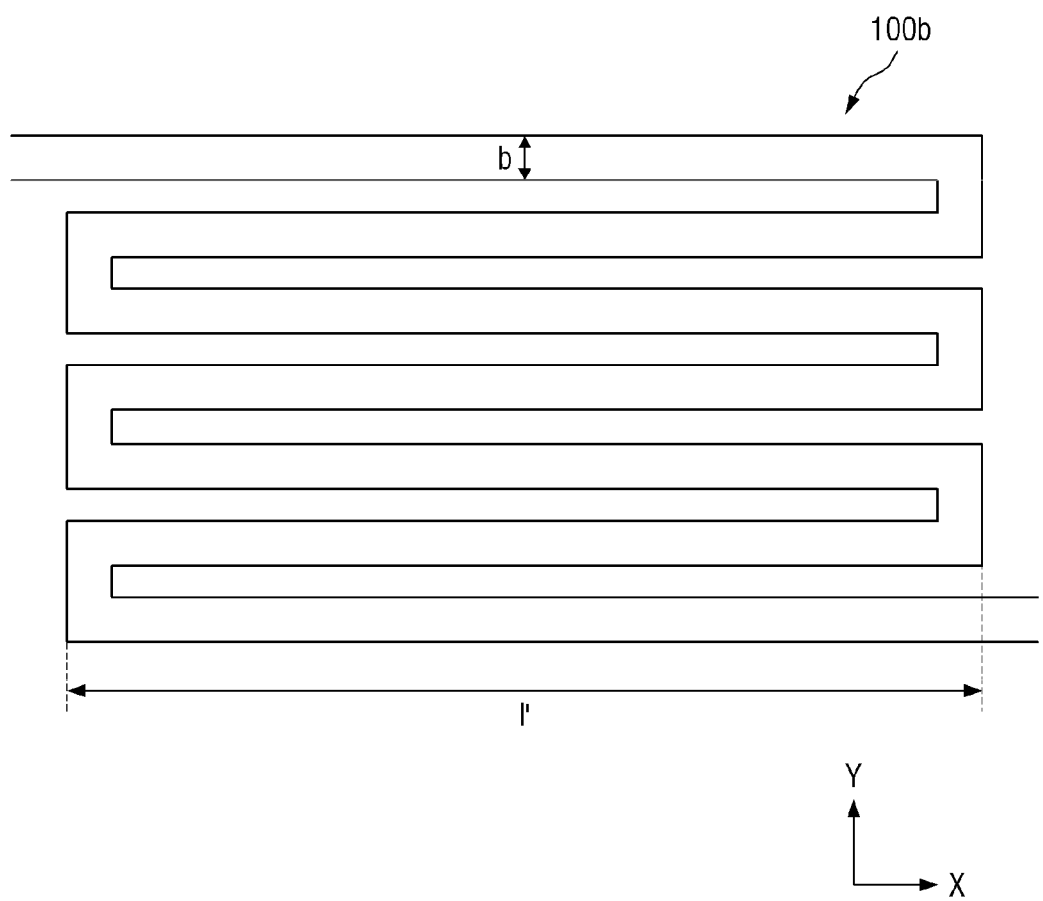

FIGS. 16A and 16B are plan views illustrating another example of the pressure sensor included in the display device of FIG. 1. FIG. 16B shows a state in which a first pressure sensor 100a of FIG. 16A is deformed due to pressure, that is, a deformed first pressure sensor 100b.

As shown in FIGS. 16A and 16B, the first pressure sensors 100a and 100b may be formed of a line or thin film formed of a zigzag-shaped metal which is formed to be relatively long in a direction parallel to a direction (the X-axis direction) to be detected. The metal line or the metal film may be bonded to the display panel 30 (see FIG. 1).

When deformation occurs in a portion of the display panel 30 (for example, a case in which the portion thereof is stretched in the X-axis direction), pressure may also be generated even in the first pressure sensor 100a in a direction parallel to the direction in which the display panel 30 is deformed. The first pressure sensor 100a according to a deformation sensing method may be deformed into the first pressure sensor 100b in a direction parallel to the direction in which the display panel 30 is deformed due to the pressure on the basis of a property such as ductility of a metal.

Consequently, a width b of the metal line or the thin metal film in the deformed first pressure sensor 100b may be smaller than a width a of the metal line or the thin metal film in the first pressure sensor 100a before deformation. In addition, a total length (l'×n, where n is the number of metal lines or thin metal films in parallel with each other in the X-axis direction) of the metal line or the thin metal film in the deformed first pressure sensor 100b may be longer by as much as about (l'−l)×n than a total length (l×n, where n is the number of metal lines or thin metal films in parallel with each other in the X-axis direction) of the metal line or the thin metal film in the first pressure sensor 100a before deformation.

Because resistance of a metal is proportional to a length of the metal and is inversely proportional to a width of the metal, the resistance of the metal line or the thin metal film in the deformed first pressure sensor 100b may be greater than resistance of the metal line or the thin metal film in the first pressure sensor 100a before deformation. Therefore, by applying a predetermined voltage to two ends of the metal line or the thin metal film and then measuring a current flowing through the two ends or by applying a predetermined current to the two ends of the metal line or the thin metal film and then measuring a voltage at the two ends, the resistance of the metal line or the thin metal film may be calculated.

That is, the resistance of the two ends of the metal line or the thin metal film of each of the first pressure sensors 100a and 100b may be calculated, and a pressure may be detected on the basis of the calculated resistance.

Figure 17:
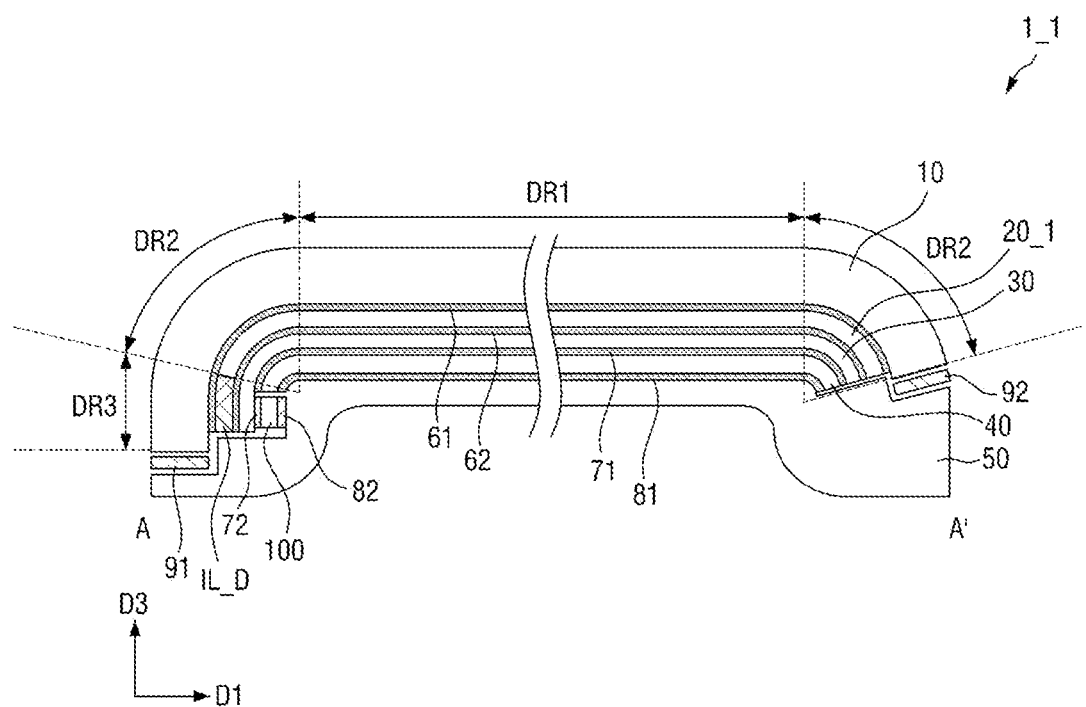
FIG. 17 is a cross-sectional view illustrating a display device according to another embodiment.

FIG. 17 is a cross-sectional view illustrating a display device according to another embodiment. FIG. 17 shows a cross section corresponding to FIG. 3.

Referring to FIGS. 1 to 3 and 17, a display device 1_1 is different from the display device 1 of FIG. 3 in that the display device 1_1 includes a touch member 20_1 and an insulating layer IL_D. The display device 1_1 is substantially the same as or similar to the display device 1 of FIG. 3, except for the touch member 20_1 and the insulating layer IL_D, and thus duplicate descriptions thereof will not be repeated herein.

The touch member 20_1 may be arranged between a display panel 30 and a window 10, may have a size that is smaller than the size of the display panel 230, and may overlap the display panel 30 in the first area DR1 and the second area DR2. That is, the touch member 20_1 may not include the first sub-sensing portion 20P1 and the second sub-sensing portion 20P2 which are described with reference to FIG. 2. In this case, the display device 1_1 may detect only a pressure through the first pressure sensor 100 in the first button area BP1 (see FIG. 1).

Meanwhile, because the display panel 30 is the same as the display panel 30 described with reference to FIGS. 2 and 3, the display panel 30 may display an image through the first sub-display portion 30P1 and the second sub-display portion 30P2 in the first button area BP1 and the second button area BP2.

The insulating layer IL_D may be arranged between the display panel 30 and the window 10 in the third area DR3. The insulating layer IL_D may have the same thickness as the touch member 20_1. In this case, the insulating layer IL_D may compensate for a step due to the touch member 20_1 and transfer a pressure applied from the outside to the first pressure sensor 100.

Meanwhile, although the insulating layer IL_D has been illustrated as being distinguished from the touch member 20_1 in FIG. 17, the present invention is not limited thereto. For example, the touch member 20_1 may not include only the sensing electrodes in the first sub-sensing area IS-BA1 and the second sub-sensing area IS-BA2 of the touch member 20_1 described with reference to FIGS. 6 and 7. That is, the insulating layer IL_D may be integrally formed with the touch member 20_1.

Figure 18:
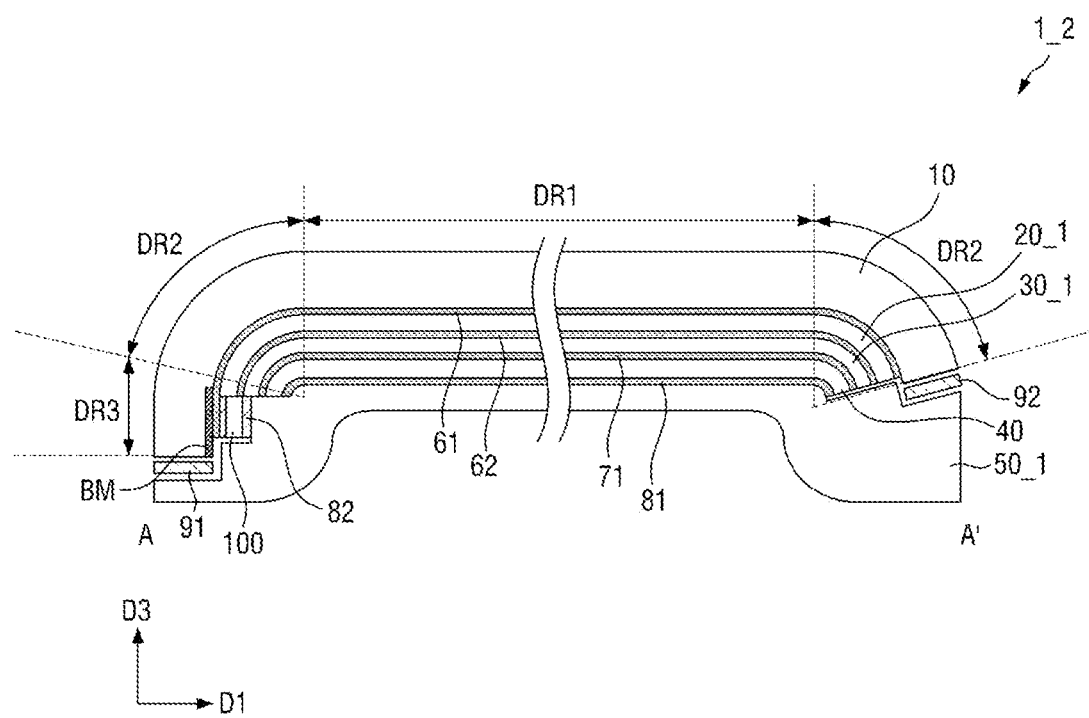
FIG. 18 is a cross-sectional view illustrating a display device according to still another embodiment.

FIG. 18 is a cross-sectional view illustrating a display device according to still another embodiment. FIG. 18 shows a cross section corresponding to FIG. 3.

Referring to FIGS. 1 to 3 and 18, a display device 1_2 is different from the display device 1 of FIG. 3 in that the display device 1_2 includes a touch member 20_1, a display panel 30_1, and a bracket 50_1. The display device 1_2 is substantially the same as or similar to the display device 1 of FIG. 3, except for the touch member 20_1, the display panel 30_1, and the bracket 50_1, and thus duplicate descriptions thereof will not be repeated herein.

The display panel 30_1 may not include the first sub-display portion 30P1 (and the second sub-display portion 30P2) described with reference to FIG. 2, may overlap a window 10 in the first area DR1 and the second area DR2, and may expose the window 10 in the third area DR3 (or the first button area BA1 and the second button area BA2).

The touch member 20_1 may be arranged between the window 10 and the display panel 30_1 and may overlap the display panel 30_1 (and the window 10) in the first area DR1 and the second area DR2. The touch member 20_1 may have substantially the same size as the display panel 30_1 and may not include the first sub-sensing portion 20P1 (and the second sub-sensing portion 20P2) described with reference to FIG. 2. Similar to the display panel 30_1, the touch member 20_1 may expose the window 10 in the third area DR3 (or the first button area BA1 and the second button area BA2).

A first pressure sensor 100 may be arranged to overlap the window 10 in the third area DR3. The first pressure sensor 100 may be coupled to the touch member 20_1 and a first cover portion 10P1 of the window 10, which is exposed by the display panel 30_1, through a transparent bonding layer 61. Here, the transparent bonding layer 61 may be arranged to overlap an entirety of a rear surface of the window 10.

In one embodiment, the display device 1_2 (or the window 10) may further include a light blocking member BM arranged between the window 10 and the first pressure sensor 100 in the third area DR3. The light blocking member BM may have a size that is larger than a size of the first pressure sensor 100, cover the first pressure sensor 100, and prevent the first pressure sensor 100 from being visually recognized from the outside. For example, the light blocking member BM may be a black matrix, but the present invention is not limited thereto. For example, the light blocking member BM may have various colors.

Figure 19:
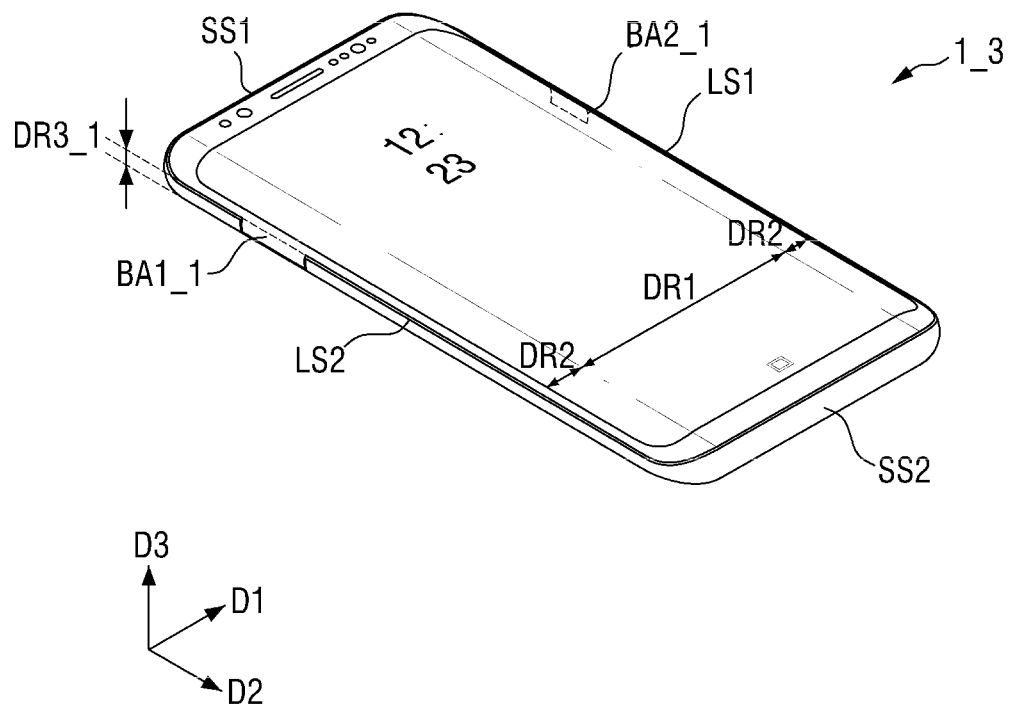
FIG. 19 is a perspective view illustrating a display device according to yet another embodiment.
Figure 20:
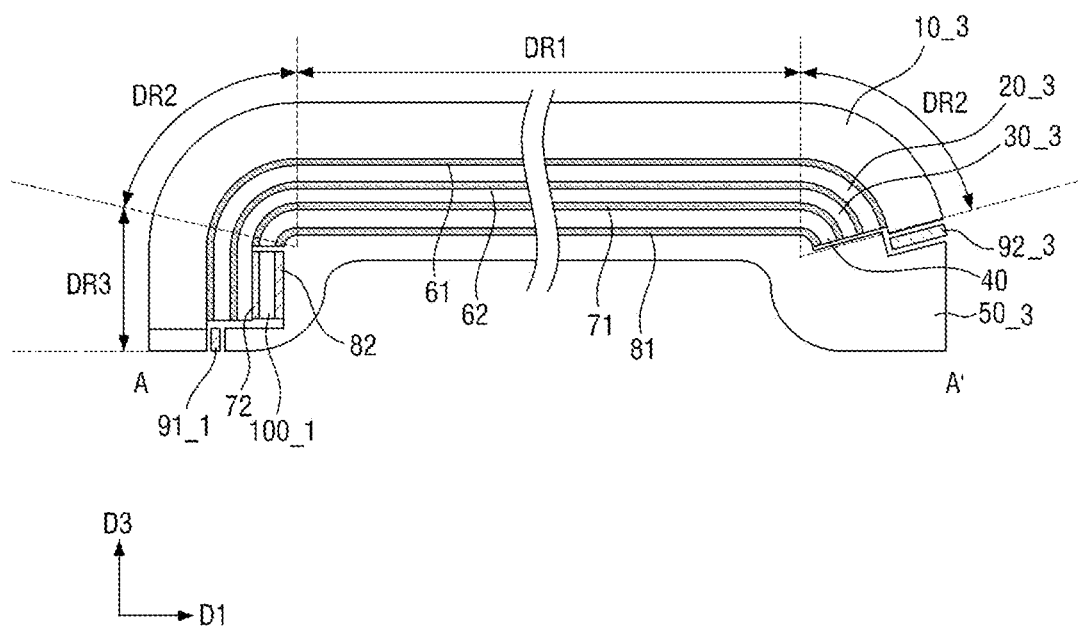
FIG. 20 is a cross-sectional view illustrating an example of the display panel of FIG. 19.

FIG. 19 is a perspective view illustrating a display device according to yet another embodiment. FIG. 20 is a cross-sectional view illustrating an example of the display panel of FIG. 19. FIG. 20 shows a cross section corresponding to FIG. 3.

Referring to FIGS. 19 and 20, a display device 1_3 is different from the display device 1 of FIG. 1 in that the display device 1_3 includes a third area DR3_1.

The third area DR3_1 may correspond to an entirety of a side surface of the display device 1_3 and include a first button area BA1_1 and a second button area BA2_1. The first button area BA1_1 may extend in the third direction D3 and may be in contact with a lower surface of the display device 1_3.

As shown in FIG. 11, the display device 1_3 may include a window 10_3, a touch member 20_3, a display panel 30_3, a cover panel sheet 40_3, a bracket 50_3, and a first pressure sensor 100_1. The window 10_3, the touch member 20_3, the display panel 30_3, the cover panel sheet 40_3, the bracket 50_3, and the first pressure sensor 100_1 are substantially the same as or similar to the window 10, the touch member 20, the display panel 30, the cover panel 40, the bracket 50, and the first pressure sensor 100 which are described with reference to FIG. 3, and thus duplicate descriptions thereof will not be repeated herein.

The window 10_3 (or the first cover portion 10P1 described with reference to FIG. 2) may extend from the third area DR3_1 (or the first button area BA1_1) to a rear surface of the display device 1_3 in the third direction D3. In the first button area BA1_1, a side surface of the window 10_3 may constitute a lower surface of the display device 1_3. The bracket 50_3 may be arranged to overlap the window 10_3 in the third area DR3_1 in the first direction D1. The waterproof tape 91_1 may be arranged between the window 10_3 and the bracket 50_3, and the bracket 50_3 may be bonded to a rear surface of the window 10_3 instead of the side surface thereof.

The touch member 20_3, the display panel 30_3, the cover panel sheet 40_3, and the first pressure sensor 100_1 may be arranged in a space between the window 10_3 and the bracket 50_3. The touch member 20_3, the display panel 30_3, the cover panel sheet 40_3, and the first pressure sensor 100_1 may be arranged to extend further in the third area DR3_1 (or the first button area BA1_1) in the third direction DR3 than the touch member 20, the display panel 30, the cover panel 40, and the first pressure sensor 100 which are described with reference to FIG. 3.

The first pressure sensor 100_1 may have a size that is larger than the size of the first pressure sensor 100. For example, the first pressure sensor 100_1 may have a height of 5 mm or more (e.g., a length in the third direction D3). In this case, a pressure input through the user's finger may be more accurately detected through the first pressure sensor 100_1.

Meanwhile, although the display device 1_3 has been illustrated as including the touch member 20_3 and the display panel 30_3 which are arranged to overlap the third area DR3_1 in FIG. 20, but the present invention is not limited thereto. For example, the display device 1_3 may include the touch member 20_1 and the display panel 30 which are described with reference to FIGS. 17 and 18 or may not include the touch member 20_3.

Figure 21:
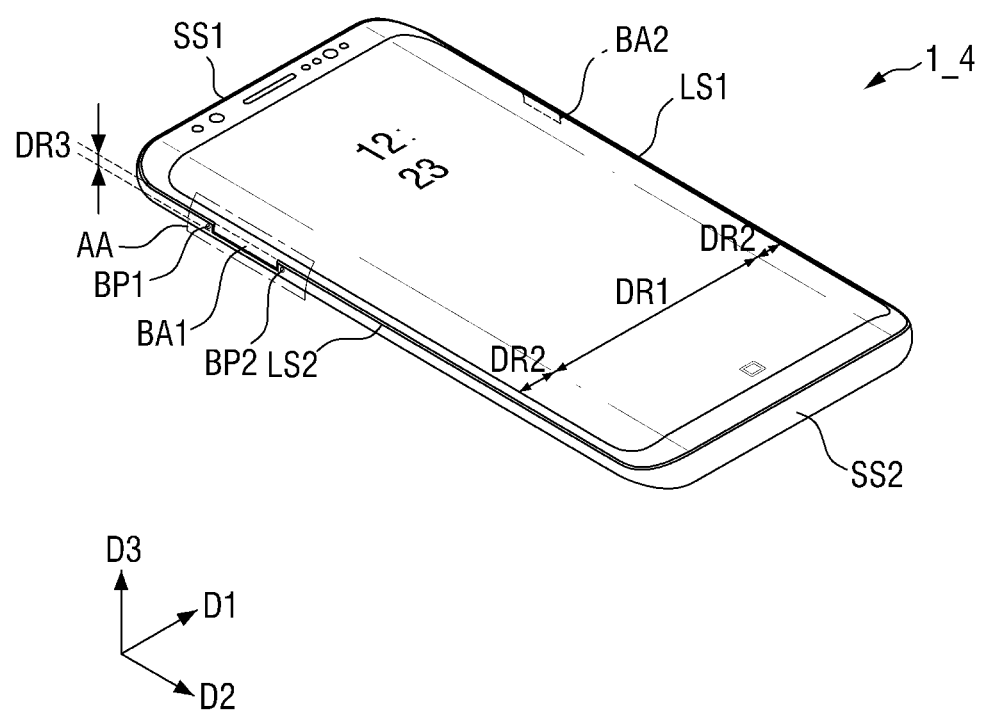
FIG. 21 is a perspective view illustrating a display device according to yet another embodiment.
Figure 22:
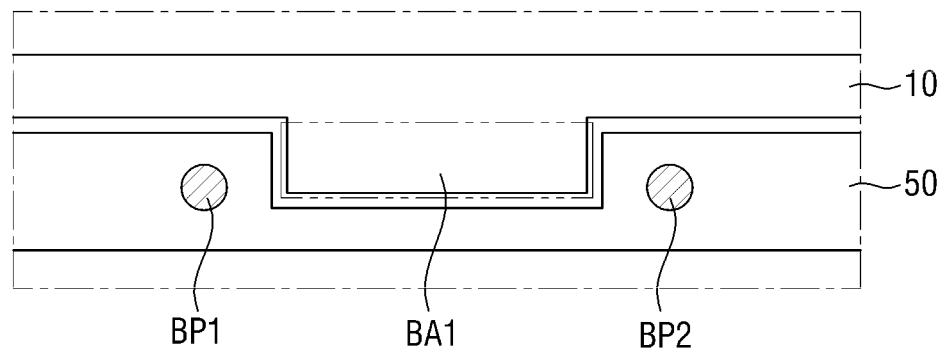
FIG. 22 is an enlarged view of Area AA shown in FIG. 21.
Figure 22:
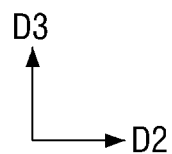

FIG. 21 is a perspective view illustrating a display device according to yet another embodiment. FIG. 22 is an enlarged view of Area AA shown in FIG. 21.

Referring to FIGS. 1, 21, and 22, a display device 1_4 is different from the display device 1 of FIG. 1 in that the display device 1_4 includes tactile patterns BP1 and BP2. The display device 1_4 is substantially the same as or similar to the display device 1 of FIG. 1, except for the tactile patterns BP1 and BP2, and thus a duplicate description thereof will not be repeated herein.

The tactile patterns BP1 and BP2 may be formed on a side surface of a bracket 50_4 adjacent to the first button area BA1. Each of the tactile patterns BP1 and BP2 may have an irregular shape which convexly protrudes from or is concavely recessed into the side surface of the bracket 50_4.

Although the tactile patterns BP1 and BP2 have been illustrated as each having a circular planar shape in FIG. 22, this is an example, and the present invention is not limited thereto. For example, the tactile patterns BP1 and BP2 may have polygonal shapes such as triangles and the like and planar shapes such as ellipses or may have different shapes.

Figure 23:
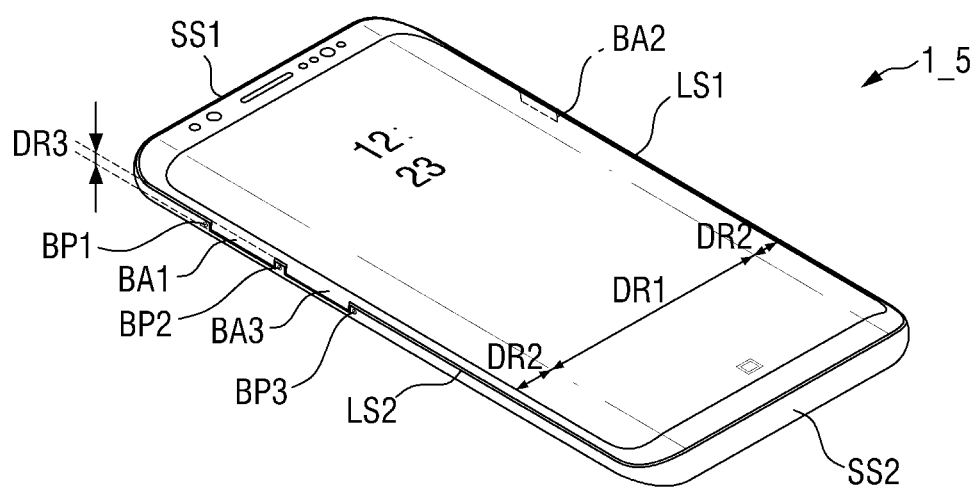
FIGS. 23 to 25 are perspective views illustrating various examples of the display device.
Figure 23:
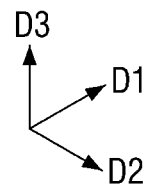
Figure 24:
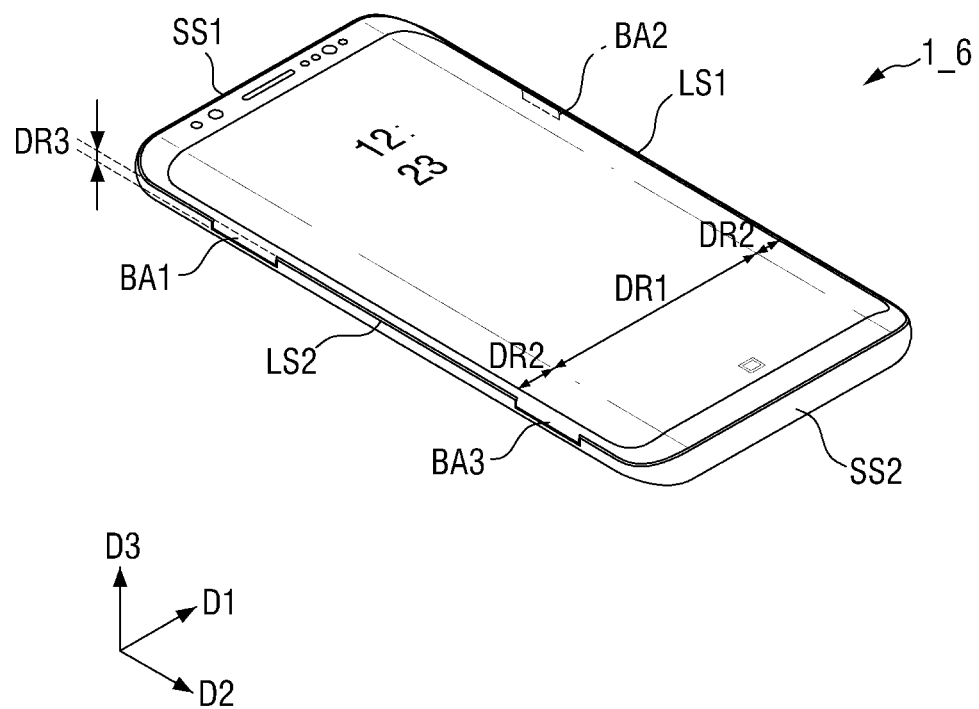
Figure 25:
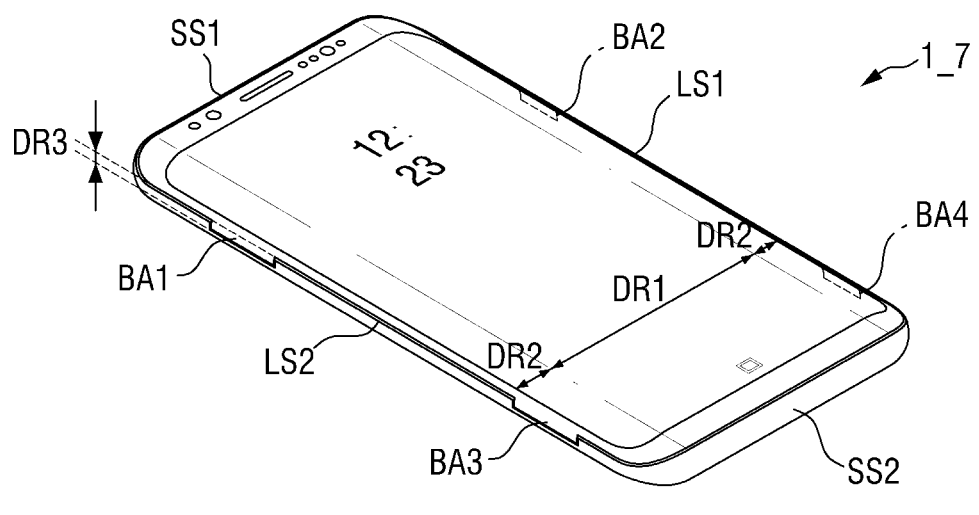
Figure 25:
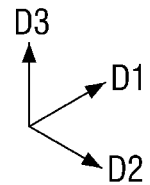

FIGS. 23 to 25 are perspective views illustrating various examples of the display device.

Referring to FIG. 23 first, a display device 1_5 is different from the display device 1 of FIG. 1 in that the display device 1_5 further includes a third button area BA3 and first, second, and third tactile patterns BP1, BP2, and BP3.

The third button area BA3 may be substantially the same as or similar to the first button area BA1 (or the second button area BA2), except for an arrangement position thereof.

The third button area BA3 may be arranged on a second side surface in contact with a second long side LS2 of the display device 1_5 to be spaced apart from the first button area BA1.

The first tactile pattern BP1 and the second tactile pattern BP2 may be substantially the same as the first tactile pattern BP1 and the second tactile pattern BP2 which are described with reference to FIG. 13.

The second tactile pattern BP2 may be formed between the first button area BA1 and the third button area BA3 in the second side surface of the display device 1_5. The second tactile pattern BP2 may distinguish between the first button area BA1 and the third button area BA3 and may allow the user to recognize that the first button area BA1 and the third button area BA3 are located on both sides of the second tactile pattern BP2 (for example, in the second direction DR2).

The third tactile pattern BP3 may be arranged on one side opposite to the other side in which the second tactile pattern BP2 is arranged based on the third button area BA3 in the second side surface of the display device 1_5.

Meanwhile, although the three tactile patterns BP1, BP2, and BP3 have been illustrated in FIG. 23, this is an example, and the present invention is not limited thereto. For example, the display device 1_5 may include only the second tactile pattern BP2, include the first tactile pattern BP1 and the third tactile pattern BP3, include two second tactile patterns BP2, or may not include a tactile pattern.

In addition, although the third button area BA3 has been illustrated as being adjacent to the first button area BA1 in FIG. 23, the present invention is not limited thereto. For example, as shown in FIG. 24, a display device 1_6 may include a third button area BA3, but the third button area BA3 may be arranged to be spaced apart from a first button area BA1 and arranged adjacent to a second short side SS2 of the display device 1_6. Alternatively, the third button area BA3 may be arranged to be spaced apart from the second button area BA2 in a first side surface in contact with a first long side LS1 instead of a second long side LS2 of the display device 1_6.

Although the three button areas BA1, BA2, and BA3 have been illustrated in FIG. 23, the present invention is not limited thereto. As shown in FIG. 25, a display device 1_7 may further include a fourth button area BA4 arranged to be spaced apart from the second button area BA2 in a first side surface in contact with a first long side LS1 of the display device 1_76 or include button areas in addition to the first to fourth button areas BA1 to BA4.

Figure 26:
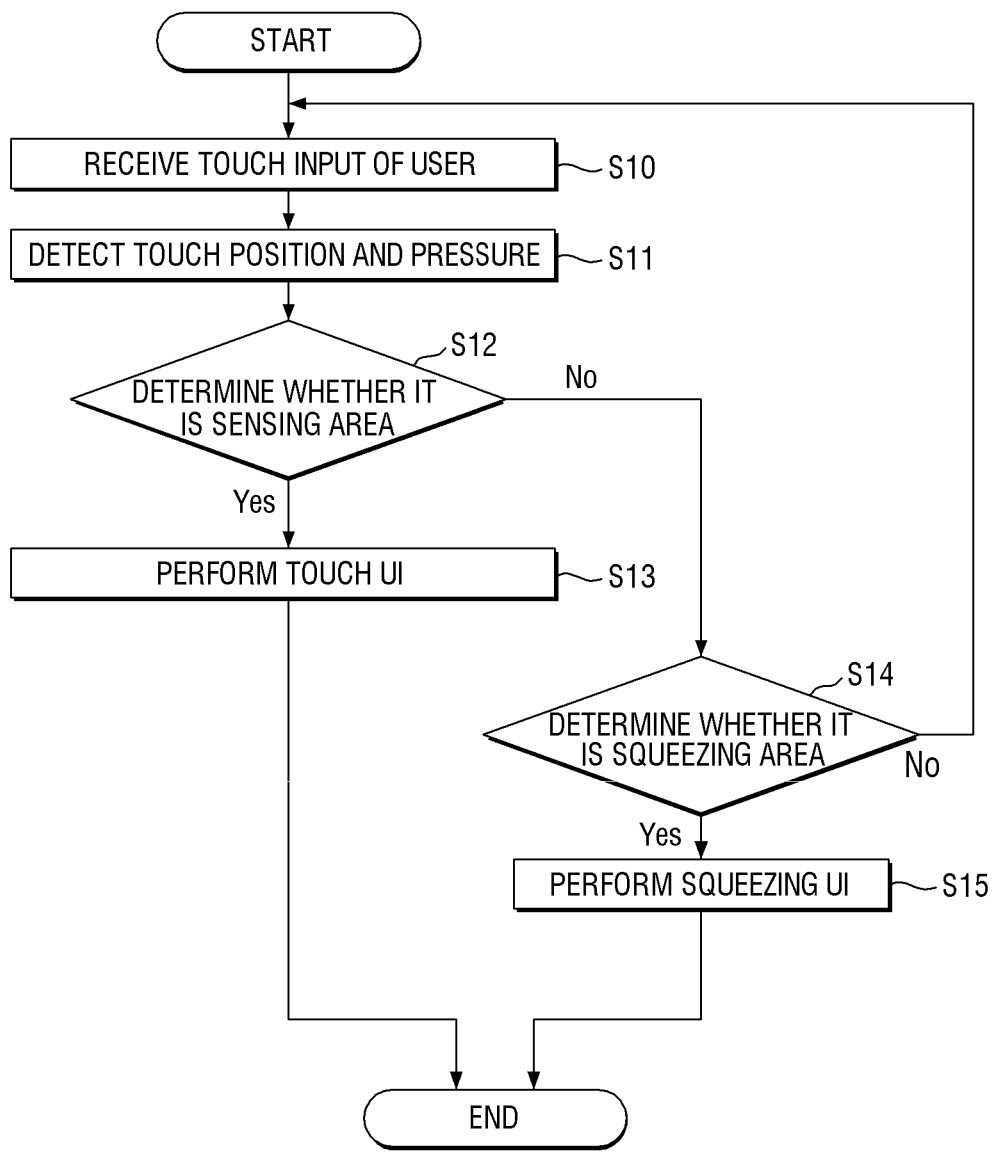
FIG. 26 is a flowchart for describing a method of driving the display device of FIG. 25 with respect to a touch event.

FIG. 26 is a flowchart for describing a method of driving the display device of FIG. 25 with respect to a touch event.

Referring to FIGS. 1, 2, 25, and 26, a function executed by the first and second button areas BA1 and BA2 will be defined as a touch user interface (UI), and a function executed by the third and fourth button areas BA3 and BA4 will be defined as a squeezing UI.

The second button area BA2 may be an area capable of performing a function of turning the power of the display device 1 on and off. That is, when a touch input of the user is provided to the second button area BA2, the function of turning the power of the display device 1 on and off may be performed through a predetermined arithmetic operation. For example, when the touch input of the user is provided to the second button area BA2, the first pressure sensor 100 shown in FIG. 2 may determine whether a pressure value is greater than or equal to a predetermined value and turn the power of the display device 1 on or off on the basis of the determination result.

The first button area BA1 may be an area capable of performing a function of controlling a volume. That is, a volume of the display device 1 may be controlled on the basis of an input of the user, which is an input provided to the first button area BA1.

The third button area BA3 may be an area for executing a predetermined application when a touch pressure that is greater than or equal to a predetermined value is provided. A type of application to be executed is not particularly limited. For example, a camera function, a music function, a Bixby function, and the like may be performed. The third button area BA3 may be omitted.

That is, the first to third button areas BA1 to BA3 may replace a role performed by the existing physical button through detecting of a touch pressure. Meanwhile, positions, shapes, and sizes in which the first to third button regions BA1 to BA3 are arranged are not limited to those shown in FIG. 25.

When the touch input of the user occurs, the third button area BA3 and the fourth button area BA4 may be squeezing areas for performing a predetermined function on the basis of the touch input of the user. For example, when the user simultaneously presses the third button area BA3 and the fourth button area BA4 with a predetermined pressure or more, a predetermined application may be executed. Here, a type of the predetermined application is not particularly limited. For example, the predetermined application may include a camera function, a music function, a Bixby function, and the like. In addition, the function may be arbitrarily set by the user. Alternatively, unlike in the drawings, when the third button area BA3 and the fourth button area BA4 are defined as one squeezing area, a plurality of squeezing areas may be included. That is, it is also possible to impart a function of independently executing an application to each of the plurality of squeezing regions.

The third button area BA3 and the fourth button area BA4 may be formed to be symmetrical to each other in one embodiment, but the present invention is not limited thereto.

In addition, as described with reference to FIG. 2, the pressure sensors 100 and 200 may be formed in only an area in which pressure sensing is required, but the present invention is not limited thereto. The pressure sensors 100 and 200 may be entirely formed on the first side surface of the display device 1_7 (i.e., the first side surface in contact with the first long side LS1) and a second side surface thereof (i.e., the second side in contact with the second long side LS2).

When a touch input of the user occurs (S10), the pressure sensors 100 and 200 may detect a touch position and a touch pressure of the user (S11).

When the touch input of the user occurs in the first button area BP1 or the second button area BP2, the above-described touch UI may be executed (S13). For example, when the user inputs the touch input into the first button area BP1, the first pressure sensor 100 may determine whether a value of the touch pressure is greater than or equal to a predetermined value to control the volume of the display device 1.

In contrast, when a touch input of the user occurs in the third button area BA3 and the fourth button area BA4, the pressure sensors (not shown) may determine whether a predetermined operation condition is satisfied (S14). For example, the pressure sensors may determine whether the user simultaneously presses the third button area BA3 and the fourth button area BA4 with a predetermined pressure value or more. When the predetermined operation condition is satisfied, the squeezing UI, for example, a predetermined application, may be immediately executed (S15).

As described above, the display device 1 may detect the touch input position and the pressure of the user using the pressure sensors 100 and 200 and compare the touch input position and the pressure with a predetermined condition, thereby performing a specific function without a physical button.

While the embodiments of the present invention have been described with reference to the accompanying drawings, those skilled in the art can understand that the present invention can be implemented in other specific forms without departing from the technical spirit or the necessary features of the present invention. Therefore, it should be understood that the above-described embodiments are not restrictive but illustrative in all aspects.

The invention claimed is:

1. A display device comprising:
   a display panel including a planar portion, a first curved portion connected to one side of the planar portion, and a first side portion connected to one side of the first curved portion, the display panel further including a first surface and a second surface opposite to the first surface;
   a window on the first surface of the display panel;
   a first pressure sensor overlapping the first side portion in a direction perpendicular to the first surface of the first side portion of the display panel,
   wherein the first side portion is non-coplanar with each of the planar portion and the first curved portion,
   a cover panel below the second surface of the display panel and overlapping the planar portion and the first curved portion,
   wherein the first pressure sensor is below the second surface of the display panel,
   wherein the first pressure sensor overlaps the display panel in a direction perpendicular to the first surface of the planar portion of the display panel, and
   wherein the first pressure sensor is spaced apart from the cover panel.

2. The display device of claim 1, wherein the first side portion protrudes from the one side of the first curved portion in a first direction, and a protruding length of the first side portion is greater than or equal to 4 mm.

3. The display device of claim 2, wherein a length of the first side portion in a second direction is smaller than a length of the planar portion in the second direction, and the second direction is perpendicular to the first direction.

4. The display device of claim 1, wherein the window includes a first cover portion overlapping the first side portion of the display panel, and the first cover portion is larger than the first side portion.

5. The display device of claim 4, further comprising a touch member between the display panel and the window,
   wherein the touch member includes a first sensing portion overlapping the first side portion.
6. The display device of claim 4, wherein:
   the window further includes a light blocking member on a lower surface of the first cover portion; and
   the first pressure sensor is coupled to the first cover portion of the window.
7. The display device of claim 4, further comprising a bracket below the display panel,
   wherein the window is coupled to the bracket through waterproof tape between a lower surface of the first cover portion and a side surface of the bracket.
8. The display device of claim 7, wherein the bracket includes a tactile pattern formed on an outer surface adjacent to the first cover portion of the window.
9. The display device of claim 1, further comprising a second pressure sensor,
   wherein the display panel further includes a second curved portion connected to the other side different from the one side of the planar portion and a second side portion connected to one side of the second curved portion,
   the second side portion is non-coplanar with each of the planar portion and the second curved portion of the display panel, and
   the second pressure sensor overlaps the second side portion.
10. The display device of claim 9, wherein the display device is configured to perform a squeezing operation in response to a pressure being simultaneously applied to the first pressure sensor and the second pressure sensor.
11. A display device comprising:
   a display panel including a planar portion, a first curved portion connected to one side of the planar portion, and a first side portion connected to one side of the first curved portion, the display panel further including a first surface and a second surface opposite to the first surface;
   a window on the first surface of the display panel;
   a first pressure sensor overlapping the first side portion in a direction perpendicular to the first surface of the first side portion of the display panel,
   wherein the first side portion is non-coplanar with each of the planar portion and the first curved portion,
   wherein the window includes a first cover portion overlapping the first side portion of the display panel, and the first cover portion is larger than the first side portion, the display device further comprising a bracket below the display panel,
   wherein the first pressure sensor overlaps the display panel in a direction perpendicular to the first surface of the planar portion of the display panel,
   wherein the window is coupled to the bracket through waterproof tape between a side surface of the first cover portion and an upper surface of the bracket.
12. A display device comprising:
   a display panel including a planar portion, a first curved portion connected to one side of the planar portion, and a first side surface connected to one side of the first curved portion;
   a window on the display panel; and
   a first pressure sensor overlapping the first side surface,
   wherein the first side surface is non-coplanar with each of the planar portion and the first curved portion,
   wherein the window includes a first cover portion overlapping the first side surface of the display panel, and the first cover portion is larger than the first side surface, the display device further comprising:
   a touch member between the planar portion of the display panel and the window; and
   an insulating member between the first side surface of the display panel and the first cover portion of the window,
   wherein the touch member does not overlap the insulating member.
13. A display device comprising:
   a display panel including a planar portion, a first curved portion connected to one side of the planar portion, and a first side portion connected to one side of the first curved portion, the display panel further including a first surface and a second surface opposite to the first surface;
   a window on the first surface of the display panel; and
   a first pressure sensor overlapping the first side portion of the display panel in a direction perpendicular to the first surface of the first side portion of the display panel,
   wherein the first side portion is non-coplanar with each of the planar portion and the first curved portion, the display device further comprising a second pressure sensor overlapping a second side portion of the display panel,
   wherein the second side portion is connected to the one side of the first curved portion of the display panel and separated from the first side portion,
   wherein the display panel is disposed between the first pressure sensor and the window,
   wherein any portion of the first pressure sensor does not overlap the planar portion of the display panel in a direction perpendicular to the first surface of the planar portion of the display panel, and
   wherein the second pressure sensor has an area different from an area of the first pressure sensor.
14. The display device of claim 13, further comprising a third pressure sensor,
   wherein the display panel further includes a third curved portion connected to the other side different from the one side of the planar portion and a third side portion connected to one side of a second curved portion,
   the third side portion is non-coplanar with each of the planar portion and the second curved portion of the display panel, and
   the third pressure sensor overlaps the third side portion.
15. The display device of claim 14, further comprising a fourth pressure sensor overlapping a fourth side portion of the display panel,
   wherein the fourth side portion is connected to the one side of the second curved portion of the display panel and separated from the third side portion.
16. A display device comprising:
   a display panel including a planar portion, a first curved portion connected to one side of the planar portion, and a first side portion connected to one side of the first curved portion, the display panel further including a first surface and a second surface opposite to the first surface;
   a window on the first surface of the display panel;
   a first pressure sensor overlapping the first side portion of the display panel in a direction perpendicular to the first surface of the first side portion of the display panel,
   wherein the first side portion is non-coplanar with each of the planar portion and the first curved portion, wherein the display panel is disposed between the first pressure sensor and the window, wherein any portion of the first pressure sensor does not overlap the planar portion of the display panel in a direction perpendicular to the first surface of the planar portion of the display panel, wherein the display panel includes:

a first pixel on the planar portion; and a second pixel on the first side portion, wherein the second pixel has an area that is smaller than an area of the first pixel.

17. A display device comprising:

a display panel including a planar portion, a first curved portion connected to one side of the planar portion, and a first side portion connected to one side of the first curved portion, the display panel further including a first surface and a second surface opposite to the first surface;

a window on the first surface of the display panel; and a first pressure sensor overlapping the first side portion of the display panel in a direction perpendicular to the first surface of the first side portion of the display panel, wherein the first side portion is non-coplanar with each of the planar portion and the first curved portion, wherein the first pressure sensor includes:
  a first substrate and a second substrate;
  a first driving electrode, a second driving electrode, a first sensing electrode, and a second sensing electrode which are on one surface of the first substrate facing the second substrate;
  a first pressure sensing layer on one surface of the second substrate facing the first substrate; and
  a second pressure sensing layer in contact with the second driving electrode and the second sensing electrode,
  wherein the first pressure sensing layer overlaps the first driving electrode and the first sensing electrode, and
a gap between the first pressure sensing layer and the first driving electrode and the first sensing electrode,
  wherein the display panel is disposed between the first pressure sensor and the window, and
  wherein any portion of the first pressure sensor does not overlap the planar portion of the display panel in a direction perpendicular to the first surface of the planar portion of the display panel.

18. The display device of claim 17, wherein:

wherein the first driving electrode, the second driving electrode, the first sensing electrode, and the second sensing electrode are provided in plurality, and the plurality of first driving electrodes and the plurality of first sensing electrodes are on one surface of the first substrate;

the first driving electrodes and the first sensing electrodes are formed to extend in a first direction; and the first driving electrodes and the first sensing electrodes are alternately arranged in a second direction crossing the first direction.

19. The display device of claim 18, wherein the first pressure sensor further includes:

a driving connection electrode to which the first driving electrodes and the second driving electrode are connected;

a sensing connection electrode to which the first sensing electrodes and the second sensing electrode are connected;

a drive line connected to the driving connection electrode and to which a driving voltage is applied; and a sensing line connected to the sensing connection electrode.

20. The display device of claim 18, wherein a number of the first driving electrodes is greater than a number of the second driving electrodes, and a number of the first sensing electrodes is greater than a number of the second sensing electrodes.

21. A display device comprising:

a display panel including a planar portion and a first side portion connected to one side of the planar portion and perpendicular to the planar portion;

a window on the display panel; and a first pressure sensor overlapping the first side portion, wherein the first side portion protrudes from the one side of the planar portion in a first direction, wherein the display panel further includes an alignment mark formed on the first side portion, wherein the display panel is disposed between the first pressure sensor and the window, and wherein any portion of the first pressure sensor does not overlap the planar portion of the display panel in a direction perpendicular to a first surface of the planar portion of the display panel.

22. A display device comprising:

a display panel including a planar portion and a first curved portion connected to one side of the planar portion;

a window on the display panel; and a first pressure sensor facing a side surface of the first curved portion of the display panel, wherein:

the window includes a first cover portion overlapping the first curved portion of the display panel and a light blocking member on a lower surface of the first cover portion, the first cover portion is larger than the first curved portion, the first pressure sensor is coupled to the first cover portion of the window, any portion of the first pressure sensor is not disposed between the window and the display panel and does not overlap the planar portion of the display panel in a direction perpendicular to a first surface of the planar portion of the display panel.

* * * * *